(12) United States Patent
Nakanishi

(10) Patent No.: US 8,780,547 B2
(45) Date of Patent: Jul. 15, 2014

(54) PROJECTOR

(75) Inventor: Sei Nakanishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/324,518

(22) Filed: Dec. 13, 2011

(65) Prior Publication Data

US 2012/0162877 A1    Jun. 28, 2012

(30) Foreign Application Priority Data

Dec. 27, 2010  (JP) ................................. 2010-289487
Mar. 17, 2011  (JP) ................................. 2011-059071

(51) Int. Cl.
*G06F 1/16*    (2006.01)

(52) U.S. Cl.
USPC ........................ 361/679.41; 353/119; 439/131

(58) Field of Classification Search
CPC ..................................................... G06F 1/1632
USPC ............ 361/679.4–679.41; 439/131; 353/119
See application file for complete search history.

(56) References Cited

U.S. PATENT DOCUMENTS

| | | | | |
|---|---|---|---|---|
| 5,305,381 | A * | 4/1994 | Wang et al. | 379/455 |
| 6,793,348 | B2 * | 9/2004 | Lee et al. | 353/119 |
| 7,095,867 | B2 | 8/2006 | Schul et al. | |
| 7,230,822 | B2 | 6/2007 | Langberg et al. | |
| 7,303,282 | B2 * | 12/2007 | Dwyer et al. | 353/15 |
| D583,356 | S * | 12/2008 | Schul et al. | D14/168 |
| 7,599,177 | B2 | 10/2009 | Jaffe et al. | |
| 7,636,235 | B2 | 12/2009 | Langberg et al. | |
| 7,689,197 | B2 * | 3/2010 | Laude et al. | 455/344 |
| 7,778,018 | B2 | 8/2010 | Motoe et al. | |
| 7,874,684 | B2 * | 1/2011 | Chang | 353/119 |
| 7,980,708 | B2 * | 7/2011 | Ishikawa et al. | 353/119 |
| 8,042,957 | B2 * | 10/2011 | Li | 353/119 |
| 2001/0001083 | A1 * | 5/2001 | Helot | 439/131 |
| 2004/0017548 | A1 | 1/2004 | Denmeade | |
| 2004/0121645 | A1 * | 6/2004 | Postrel | 439/374 |
| 2004/0231809 | A1 * | 11/2004 | Wheatley | 160/370.21 |
| 2005/0088620 | A1 * | 4/2005 | Dwyer et al. | 353/15 |
| 2005/0199668 | A1 * | 9/2005 | Wheatley | 224/483 |
| 2005/0244025 | A1 * | 11/2005 | Schul et al. | 381/334 |
| 2006/0052064 | A1 * | 3/2006 | Goradesky | 455/90.3 |
| 2006/0121250 | A1 * | 6/2006 | Wheatley | 428/141 |
| 2006/0221776 | A1 * | 10/2006 | Roman et al. | 369/1 |
| 2006/0250764 | A1 * | 11/2006 | Howarth et al. | 361/683 |
| 2007/0247794 | A1 * | 10/2007 | Jaffe et al. | 361/681 |
| 2007/0288678 | A1 * | 12/2007 | Langberg et al. | 710/303 |
| 2008/0075295 | A1 * | 3/2008 | Mayman et al. | 381/79 |

(Continued)

FOREIGN PATENT DOCUMENTS

| | | |
|---|---|---|
| CN | 1650617 A | 8/2005 |
| CN | 101387900 A | 3/2009 |

(Continued)

*Primary Examiner* — Adrian S Wilson
(74) *Attorney, Agent, or Firm* — Oliff PLC

(57) ABSTRACT

A projector includes a connecting unit which connects with and places a media player thereon. The connecting unit includes a connecting section which connects with and places the media player thereon in a manner that enables insertion and removal, a moving section which rotatably holds the connecting section and moves in a manner that enables sending-out of and sending-into a body of the projector, and a driving mechanism section (slide mechanism section) which drives the moving section in a manner that enables the sending-out and sending-in.

8 Claims, 13 Drawing Sheets

(56) References Cited

U.S. PATENT DOCUMENTS

| | | | |
|---|---|---|---|
| 2008/0084511 A1* | 4/2008 | Moizio et al. | 348/789 |
| 2008/0089547 A1* | 4/2008 | Young et al. | 381/386 |
| 2008/0278894 A1* | 11/2008 | Chen et al. | 361/681 |
| 2009/0129010 A1* | 5/2009 | Park et al. | 361/679.56 |
| 2010/0118485 A1 | 5/2010 | Crooijmans et al. | |
| 2010/0134984 A1* | 6/2010 | Lum et al. | 361/725 |
| 2010/0149748 A1* | 6/2010 | Lam | 361/679.41 |
| 2010/0158297 A1* | 6/2010 | Stuczynski | 381/332 |
| 2010/0320341 A1* | 12/2010 | Baumann et al. | 248/206.2 |

FOREIGN PATENT DOCUMENTS

| | | |
|---|---|---|
| JP | A-2006-3656 | 1/2006 |
| JP | A-2009-289523 | 12/2009 |
| JP | B2-4399004 | 1/2010 |
| WO | WO 2010/048662 A1 | 5/2010 |

* cited by examiner

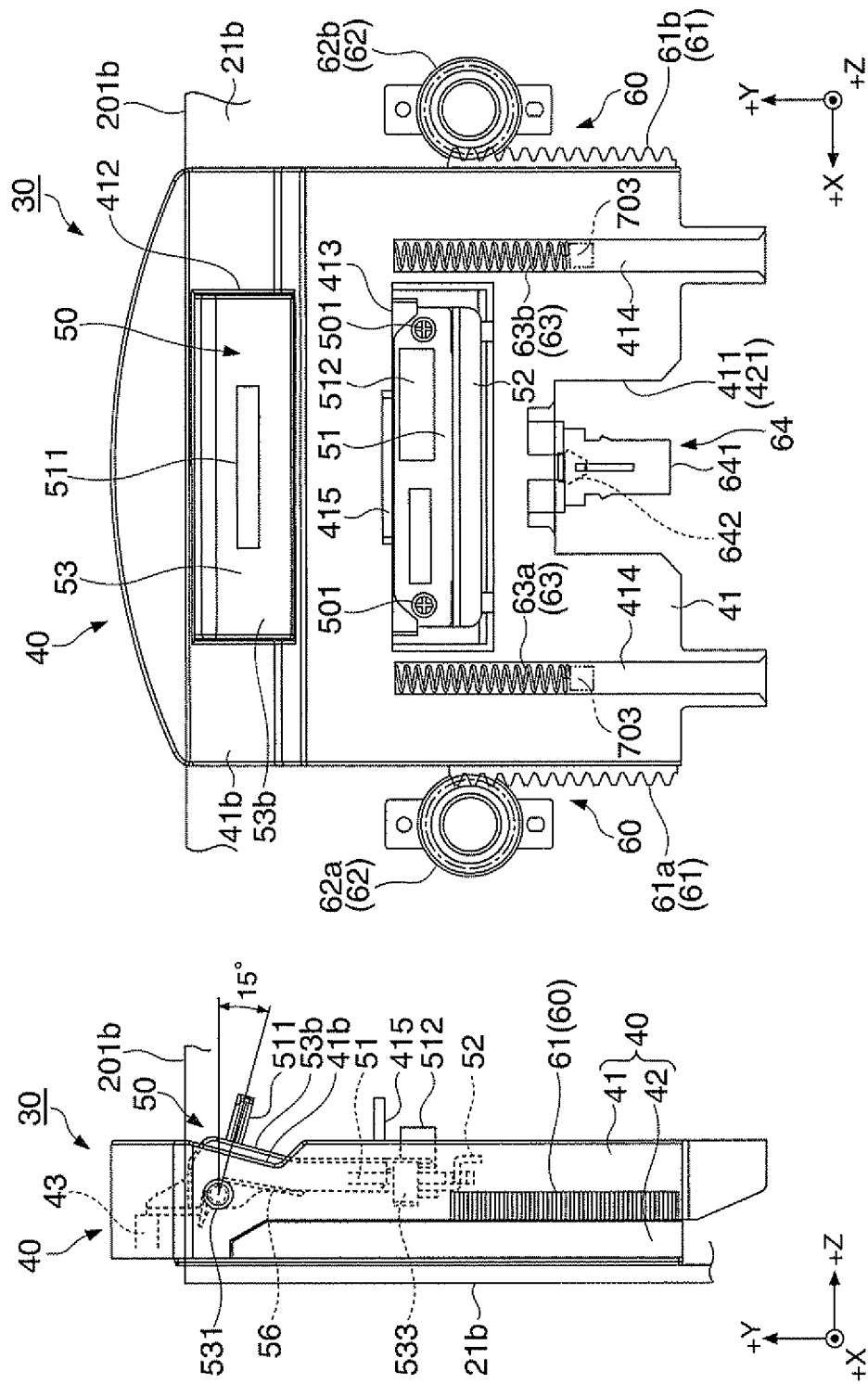

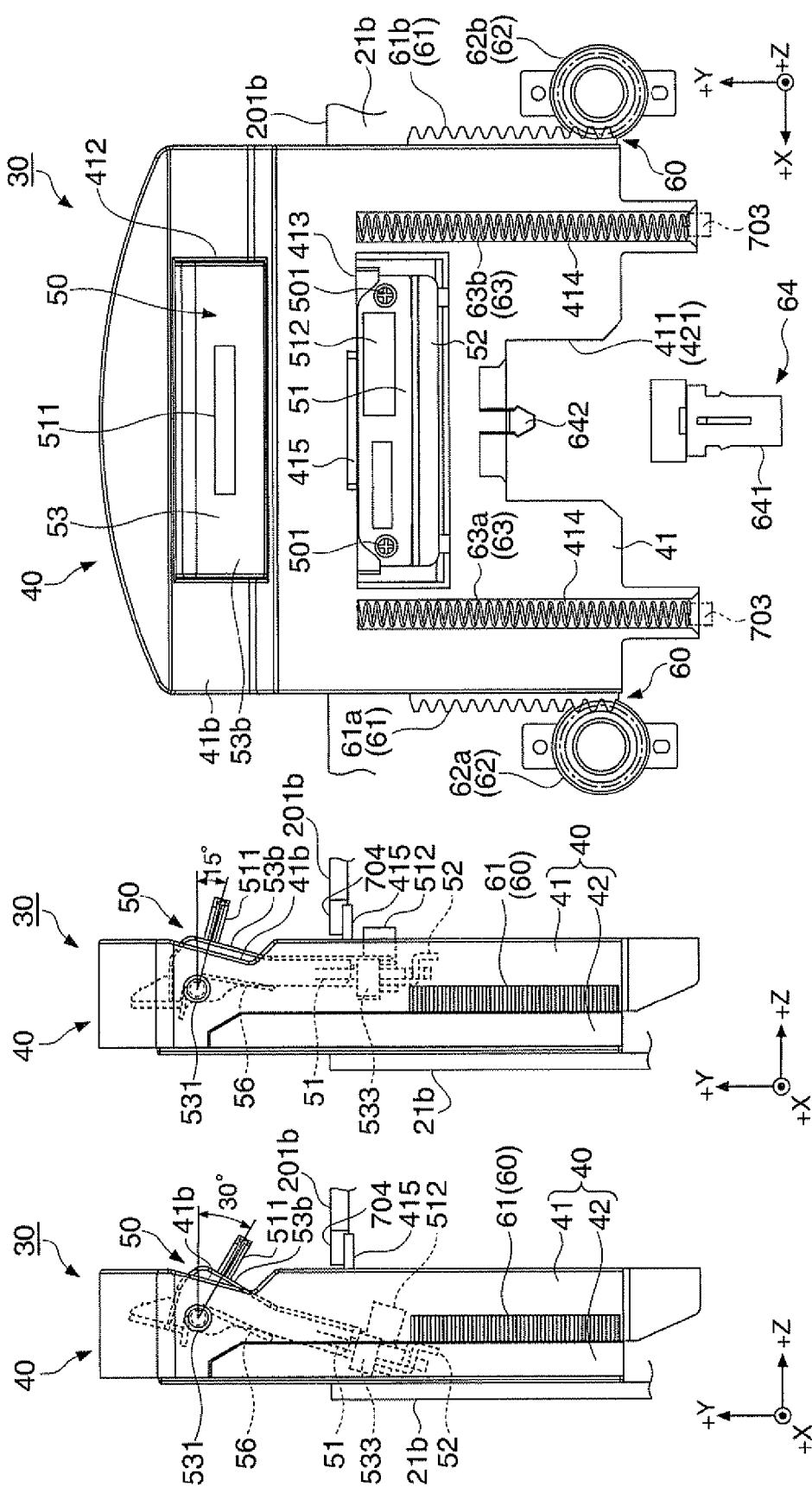

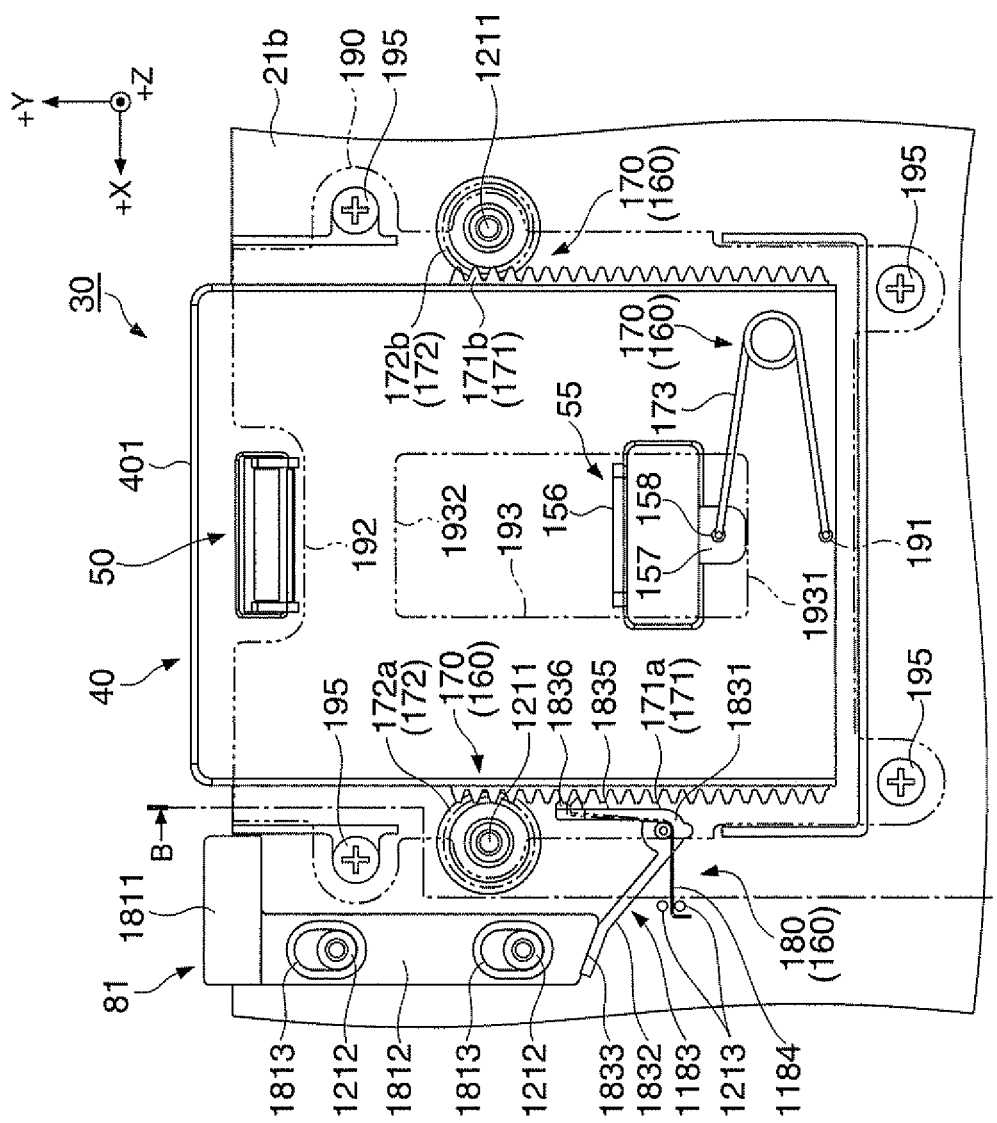
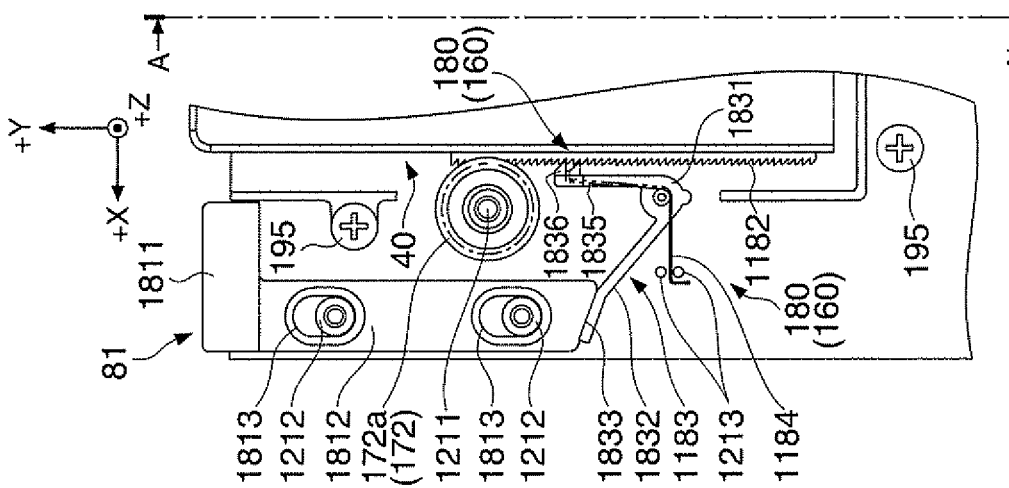
FIG. 10A
FIG. 10B

PROJECTOR

BACKGROUND

1. Technical Field

The present invention relates to a projector.

2. Related Art

Recently, a portable media player may be connected to a speaker device or the like and audio data stored within the media player may be outputted as an amplified sound.

The specification of U.S. Pat. No. 7,599,177 discloses a technique of connecting a portable media player to a connecting unit configured in a projector, then magnifying and projecting image data stored within the media player as an image on a screen or the like from a projector, and outputting audio data stored within the media player as a sound from a speaker attached to the projector.

However, in U.S. Pat. No. 7,599,177, the connecting unit is fixed at a predetermined position in the projector. A connector that is installed in the connecting unit and electrically connects with the media player is constantly exposed outside. This configuration has a problem that reliability of electrical connection between the connector and media player is lowered by external factors, such as unstable electrical connection due to adherence of dust to the exposed connector. This configuration also has a problem that the projector's degree of freedom of design is limited because the connection unit is constantly exposed. When the media player is simply connected to the connector and thus fixed, the fixing of the media player tends to be unstable against external forces or the like and therefore there is a problem that reliability of mechanical connection is lowered. Moreover, there is also a problem that the unstable connection of the connected media player causes inability to operate keys on the connected media player.

Thus, a projector with improved reliability of electrical and mechanical connection with a portable media player and improved degree of freedom of design is desired.

SUMMARY

An advantage of some aspects of the invention is to solve at least a part of the problems described above, and the invention can be implemented as the following forms or application examples.

APPLICATION EXAMPLE 1

A projector according to this application example includes a connecting unit for holding a portable electronic device. The electronic device and the projector abut on each other in a state where the electronic device is held by the connecting unit. A receiving section is provided on the side of the projector at a position of the abutment.

Such a projector can be placed (fixed or held) in a mechanically stable manner in relation to the electronic device by having the electronic device abutting on the receiving section. Therefore, reliability of mechanical connection between the electronic device and a connecting section (projector) can be improved.

APPLICATION EXAMPLE 2

In the projector according to the above application example, it is preferable that the connecting unit includes a connecting section for holding the electronic device and that the connecting section holds the electronic device rotatably in a direction in which the receiving section is arranged.

With such a projector, the connected electronic device can be rotated to abut on a desired portion on the projector side. Therefore, concentration of stress on the connecting section can be reduced and stable fixing of the electronic device can be realized. Thus, reliability of mechanical connection can be improved.

APPLICATION EXAMPLE 3

In the projector according to the above application example, it is preferable that the connecting section has a connector which electrically connects the electronic device with a body of the projector, and a rotation supporting section which rotatably supports the connector.

With such a projector, a structure for carrying out connection with and rotation of the electronic device can be realized easily.

APPLICATION EXAMPLE 4

In the projector according to the above application example, it is preferable that the connecting unit has an energizing section which energizes the connector to stand at a predetermined angle.

With such a projector, in the case of connecting the electronic device to the connector, as the energizing section energizes the connector in the standing direction, the connector can be prevented from being inclined. Therefore, the electronic device can be connected to the connector more easily.

APPLICATION EXAMPLE 5

In the projector according to the above application example, it is preferable that when the electronic device is installed on the connecting section, due to the weight of the electronic device, the electronic device rotates toward the receiving section against the energization and abuts on the receiving section.

With such a projector, the electronic device can be made to abut gently on the body of the projector. Thus, as the electronic device is connected to and placed on the connecting section, concentration of stress on the connecting section can be reduced and stable fixing of the connected electronic device can be realized. Therefore, keys on the electronic device can be operated securely and stable transmission of information with the inside of the projector can be realized. Thus, stable projection and audio output or the like by the projector can be carried out.

APPLICATION EXAMPLE 6

In the projector according to the above application example, it is preferable that the connecting section is arranged on a moving section constituted by a separate member from the body of the projector, and that as the moving section is moved, the connecting section is exposed so that the electronic device can be installed thereon.

With such a projector, since it suffices to exposed the connecting section outside only when using the connecting section, influence of external factors on connection, such as adherence of dust to the connecting section, can be reduced and reliability of electrical connection with an external electronic device (for example, media player) can be improved. Moreover, the degree of freedom in the design of the projector can be improved. Here, the moving section is typically a holding member which holds the connecting section. The connecting section that is housed may be exposed by linearly sliding the holding member from inside the projector, or the connecting section that is housed may be exposed by rotating the holding member about a connecting part between the holding member and the projector body to such an extent that the holding member faces a substantially horizontal direction from a state of facing a vertical direction. In an example of this application, only the former case of linear movement is described.

APPLICATION EXAMPLE 7

In the projector according to the above application example, it is preferable that the connecting unit has a driving mechanism section for moving the moving section to enter and exit from the body of the projector.

With such a projector, the moving section which holds the connecting section can be sent out of the projector body, and when the moving section is not used, the moving section can be sent into the projector body.

APPLICATION EXAMPLE 8

In the projector according to the above application example, it is preferable that the driving mechanism section includes a slide mechanism section for linearly moving the moving section, and that the slide mechanism section includes a slide rack installed on the moving section along a sending-out direction in which the moving section is sent out, and a slide pinion which is arranged on the body of the projector and meshes with the slide rack.

With such a projector, as the sliding mechanism section slides the moving section, stable sending-out can be carried out. Moreover, this stable sending can be realized by a simple configuration.

APPLICATION EXAMPLE 9

In the projector according to the above application example, it is preferable that the driving mechanism section includes an adjustment mechanism section which adjusts an amount of movement of the moving section.

With such a projector, as the adjustment mechanism section adjusts the amount of slide of a placement section, the electronic device connected to the connecting section can be slit to an optimum position. Therefore, stable placement and connection in relation to the electronic device can be carried out.

BRIEF DESCRIPTION OF THE DRAWINGS

The invention will be described with reference to the accompanying drawings, wherein like numbers reference like elements.

FIGS. 4A and 4B show the housed state of the connecting unit in the first embodiment.

FIGS. 6A to 6C show the sent-out state of the connecting unit in the first embodiment.

FIGS. 10A and 10B show the housed state of the connecting unit in the second embodiment.

DESCRIPTION OF EXEMPLARY EMBODIMENTS

Hereinafter, embodiment will be described with reference to the drawings.

First Embodiment

Figure 1:
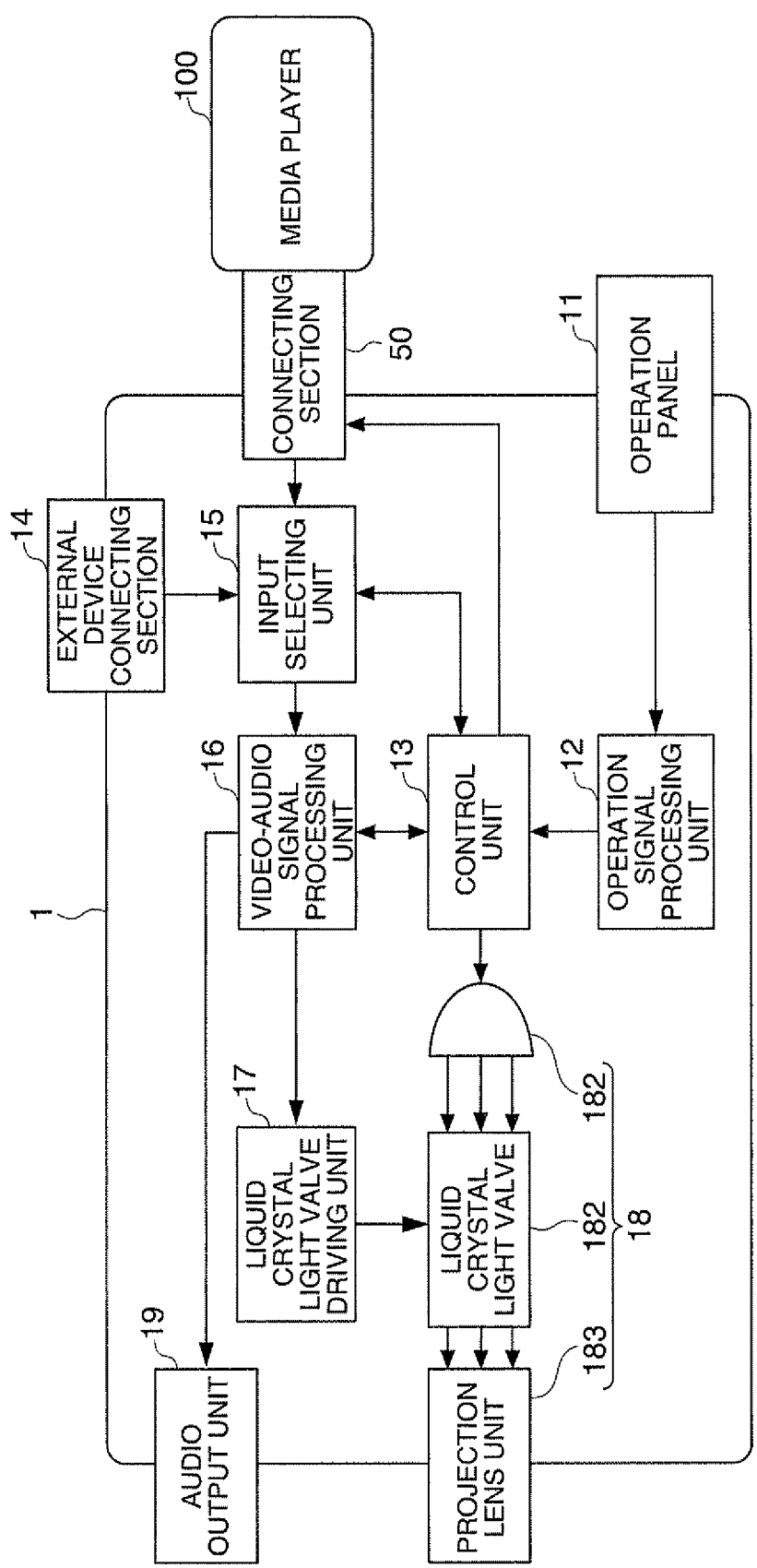
FIG. 1 is a functional block diagram showing a projector according to an embodiment.

FIG. 1 is a functional block diagram of a projector 1 according to an embodiment. The configuration and operation of the projector 1 will be described with reference to FIG. 1.

The projector 1 includes an operation panel 11, an operation signal processing unit 12, a control unit 13, a connecting section 50, an external device connecting section 14, an input selecting unit 15, a video-audio signal processing unit 16, a liquid crystal light valve driving unit 17, an optical unit 18, an audio output unit 19, and the like. The optical unit 18 includes a light source 181, a liquid crystal light valve 182, a projection lens unit 183 and the like.

The connecting section 50 is installed on a moving section 40 (see FIG. 2) which slides as will be described later. A portable media player 100 is connected to the connecting section 50. The external device connecting section 14 has various connectors (not shown) and can connect with external connection devices (not shown) such as PC (personal computer), video tape recorder and DVD (digital versatile disk) player.

The operation panel 11 is provided on an outer surface of a casing 20 (see FIG. 2) forming an exterior of the projector 1 and adapted for accepting user's operation inputs. As the user presses a key switch arranged on the operation panel 11, an operation signal corresponding to that key switch is outputted to the operation signal processing unit 12. The operation signal processing unit 12 receives the operation signal outputted from the operation panel 11, performs processing such as conversion to a digital signal, and outputs the processed signal to the control unit 13.

The control unit 13 controls the operation of the input selecting unit 15, the video-audio signal processing unit 16, the optical unit 18 (light source 181) and the like, and part of the operation of the media player 100. The control unit 13 includes an arithmetic operation device such as microcomputer or CPU (central processing unit) and a control program which prescribes the operation of the arithmetic operation device.

The input selecting unit 15 switches external devices (media player 100 and one of the external connection devices) to be connected to the projector 1 (i.e., to input a video signal or audio signal to the video-audio signal processing unit 16) according to a signal from the control unit 13.

Now, the following description of the configuration is for a case where the input selecting unit 15 selects the media player 100 according to the signal from the control unit 13, as an example.

The media player 100 selected by the input selecting unit 15 outputs video information and audio information stored within the media player 100 as a video signal and an audio signal via the connecting section 50. The outputted video signal and audio signal are inputted to the video-audio signal processing unit 16.

The video-audio signal processing unit 16 receives the video signal outputted from the media player 100, generates an output video signal based on the inputted video signal according to an instruction from the control unit 13, and outputs the output video signal to the liquid crystal light valve driving unit 17. The video-audio signal processing unit 16 also receives the audio signal outputted from the media player 100, generates an output audio signal based on the inputted audio signal according to an instruction from the control unit 13, and outputs the output audio signal to the audio output unit 19.

The light source 181 is a supply unit of light for projecting a video on a screen (not shown) and emits light toward the liquid crystal light valve 182. As the light source 181 in this embodiment, a discharge lamp is used. As the light source 181, various solid-state light emitting devices such as laser diode, LED (light emitting diode) organic EL (electroluminescence) element, and silicon light emitting device may also be used as well as the discharge lamp.

The liquid crystal light valve driving unit 17 drives the liquid crystal light valve 182 according to the output video signal outputted from the video-audio signal processing unit 16. In the liquid crystal light valve 182, plural pixels (not shown) are formed in a matrix form. As the transmittance of each pixel is adjusted by the liquid crystal light valve driving unit 17, the light emitted from the light source 181 is modulated and then emitted toward the projection lens unit 183. In this embodiment, a transmitting liquid crystal panel is employed as the liquid crystal light valve 182 as a light modulator. However, without being limited to this example, a reflecting liquid crystal panel may also be employed.

The light emitted from the liquid crystal light valve 182 is magnified and projected on the screen by the projection lens unit 183. The projection lens unit 183 includes a focusing mechanism (not shown) capable of changing the focus of projected light, and a zooming mechanism (not shown) capable of changing the magnifying power of the projected light.

The audio output unit 19 includes a speaker or the like and performs audio output based on the output audio signal outputted from the video-audio signal processing unit 16.

Figure 2:
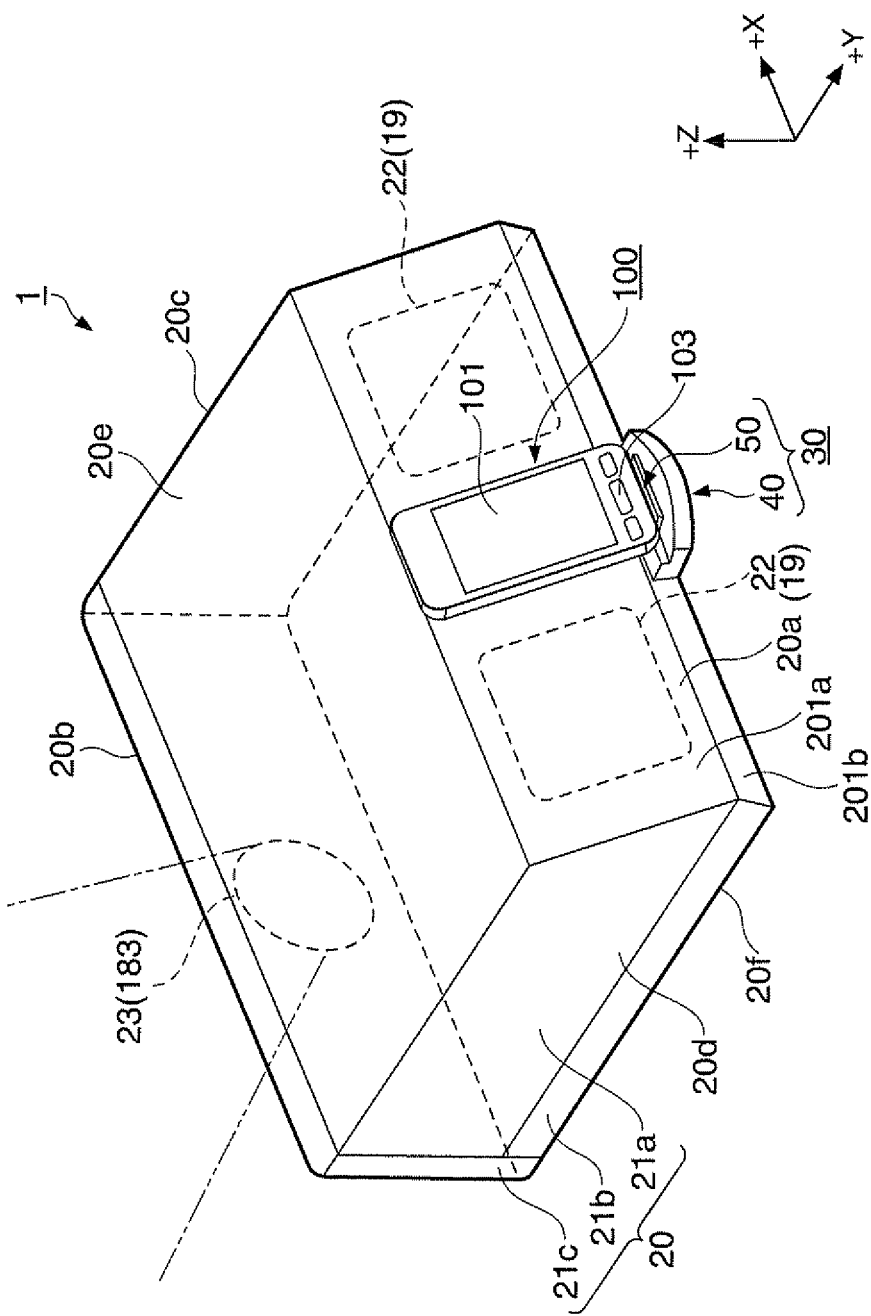
FIG. 2 is a schematic perspective view showing the state where a media player is installed on a connecting unit in the first embodiment.
Figure 3A:
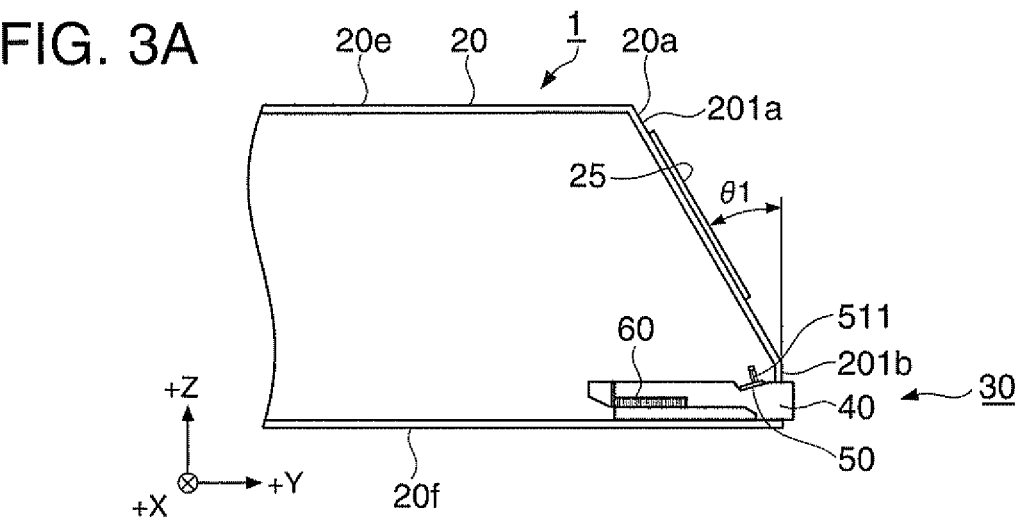
FIGS. 3A to 3C are schematic side sectional views of the projector in the first embodiment.
Figure 3B:
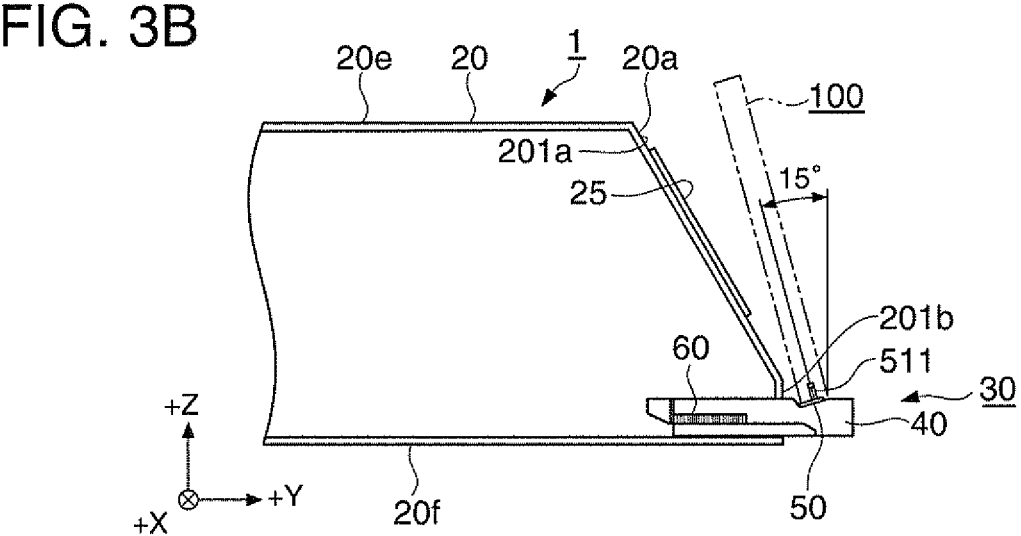
Figure 3C:
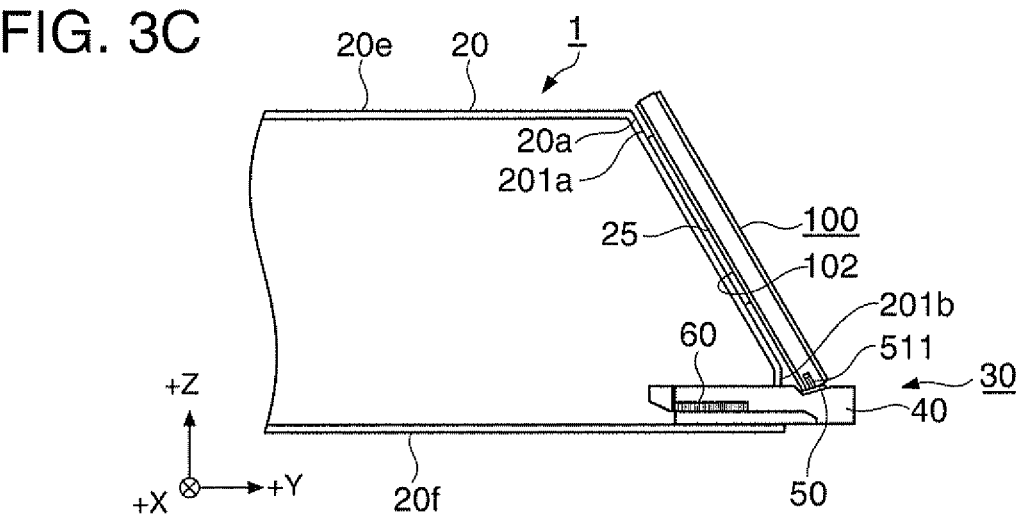

FIG. 2 is a schematic perspective view showing the state where the media player 100 is installed on a connecting unit 30 of the projector 1. FIGS. 3A to 3C are schematic side sectional views of the projector 1. FIG. 3A is a schematic side sectional view showing the state where the moving section 40 is sent into the projector 1. FIG. 3B is a schematic side sectional view showing the state where the moving section 40 is sent out of the inside of the projector 1 and the state where the media player 100 is connected to (loaded on) the connecting section 50 (connector 511). FIG. 3C is a schematic side sectional view showing the state where the media player 100 is used. The outer configuration of the projector 1 and the schematic operation of the connecting unit 30 will be described with reference to FIG. 2 and FIGS. 3A to 3C.

The projector 1 of this embodiment can connect with the portable media player 100, input the video information and audio information stored in the media player 100, project the video from a projection lens 23, and output the audio from a speaker 22, as shown in FIG. 2.

As shown in FIG. 2, the projector 1 has an exterior made up of the casing 20 formed in a substantially hexahedral box shape. The six sides of the casing 20 are referred to as a front side 20a, a rear side 20b, a right side 20c, a left side 20c, a top side 20e, and a bottom side 20f.

In the drawings used to describe this embodiment (FIG. 2 and the subsequent drawings), an XYZ orthogonal coordinate system is used for convenience of explanation. Specifically, a direction from the rear side 20b toward the front side 20a in the projector 1 is defined as Y-axis direction (+Y direction). A direction orthogonal to the Y-axis direction from the left side 20d toward the right side 20c of the projector 1 is defined as X-axis direction (+X direction). A direction orthogonal to the Y-axis direction and X-axis direction from the bottom side 20f toward the top side 20e is defined as Z-axis direction (+Z direction). However, when appropriate, the +Y direction may also be referred to as forward direction (−Y direction as backward direction), the +X direction may also be referred to as rightward direction (−X direction as leftward direction), and the +Z direction may also be referred to as upward direction (−Z direction as downward direction).

As will be described more in detail later, the connecting unit 30 includes the connecting section 50 which connects with the media player 100 and has the media player 100 placed thereon, the moving section 40 which rotatably holds the connecting section 50, a slide mechanism section 60 as a driving mechanism section which moves (slides) the moving section 40, and the like.

As shown in FIG. 3A, when the connecting unit 30 is not used, the connecting unit 30 (moving section 40 and connecting section 50) are housed (sent in) within the casing 20 of the projector 1. However, a forward end of the moving section 40 (an end in the +Y direction of the moving section 40) is protruding from the front side 20a (vertical surface 201b). Hereinafter, this state is also referred to as "housed state" when appropriate. Also, as shown in FIG. 2, the connecting unit 30 is installed in such a manner that the media player 100 is situated substantially at the center in a left-right direction on the front side 20a.

As shown in FIG. 3B, the moving section 40 is sent out in a sending-out direction (+Y direction) from inside the projector 1 by the driving mechanism section (slide mechanism section 60) as will be described later. Hereinafter, this state is also referred to as "sent-out state" when appropriate. In this sent-out state, the media player 100 is connected to (loaded on) the connecting section 50 (connector 511) rotatably held by the moving section 40.

In this embodiment, the connector 511 is installed in the state of being inclined by approximately 15 degrees, as a predetermined angle, toward the body of the projector 1 (toward the casing 20) from the vertical direction (+Z direction) in relation to the sending-out direction (+Y direction) of the moving section 40. This angle of the connector 511 (the angle of approximately 15 degrees at which the connector is inclined toward the casing 20 in relation to the +Z direction (upward direction)) is referred to "initial angle" when appropriate. In the sent-out state, the media player 100 is loaded from above on the connector 511 having such an initial angle.

When the media player 100 is loaded on the connecting section 50, the connecting section 50 rotates toward the casing 20 because of the weight of the media player 100. A rear side 102 of the media player 100 abuts on a receiving section 25 installed on the front side 20a of the casing 20 and the connecting section 50 stops rotating, as shown in FIG. 3C. This state is where the media player 100 is used. Hereinafter, this state is referred to as "use state" when appropriate. The front side 20a of the casing 20 is formed by an inclined surface 201a having an angle θ1 in relation to the +Z direction (upward direction) and the receiving section 25 is installed on the inclined surface 201a, as shown in FIG. 3A.

In this embodiment, as shown in FIG. 3C, when the media player 100 abuts on the receiving section 25, the media player 100 is installed substantially parallel to the inclined surface 201a (at the angle θ1). The media player 100 is installed also substantially parallel to the receiving section 25. This angle θ1 is set in consideration of the thickness and plane size of the media player 100, and viewability of a display section 101 of the media player 100, operability of keys 103 and the like at the time of using the media player 100.

To shift the connecting unit 30 from the housed state to the sent-out state, the forward end of the moving section 40 is slightly pushed toward the casing 20 (−Y direction), as will be described later. Thus, the lock of a latch section 64 (see FIGS. 4A and 4B), which will be described later, is canceled and the slide mechanism section 60 operates. The moving section 40 starts sliding, thus achieving the sent-out state. On the other hand, to shift the connecting unit 30 from the sent-out state to the housed state, the forward end of the moving section 40 is continuously pushed toward the casing 20 (−Y direction) and is thus pushed into the casing 20. Thus, the moving section 40 becomes locked by the latch section 64, achieving the housed state.

The casing 20 of the projector 1 is divided on the front side 20a by an XY-plane passing through the boundary between the inclined surface 201a and the vertical surface 201b, and thus includes an upper case 21a constituting casing 20 in the upward direction (+Z direction), a lower case 21b constituting the casing 20 in the downward direction (−Z direction), and a rear case 21c constituting the casing 20 on the rear side 20b, as shown in FIG. 2. The connecting unit 30 is installed within the casing 20 (lower case 21b), lying along the bottom side 20f substantially at the center in the left-right direction on the vertical surface 201b in a lower part of the front side 20a.

In the projector 1, the speaker 22 constituting the audio output unit 19 is installed within the casing 20 (upper case 21a) on the front side 20a (inclined surface 201a) in the left-right direction where the media player 100 is placed, as shown in FIG. 2. Thus, audios are outputted from the media player 100. Moreover, in the projector 1, the projection lens 23 constituting the projection lens unit 183 is installed within the casing 20 (rear case 21c) on the rear side 20b. Thus, videos are projected in the −Y direction from the media player 100.

Figure 5A:
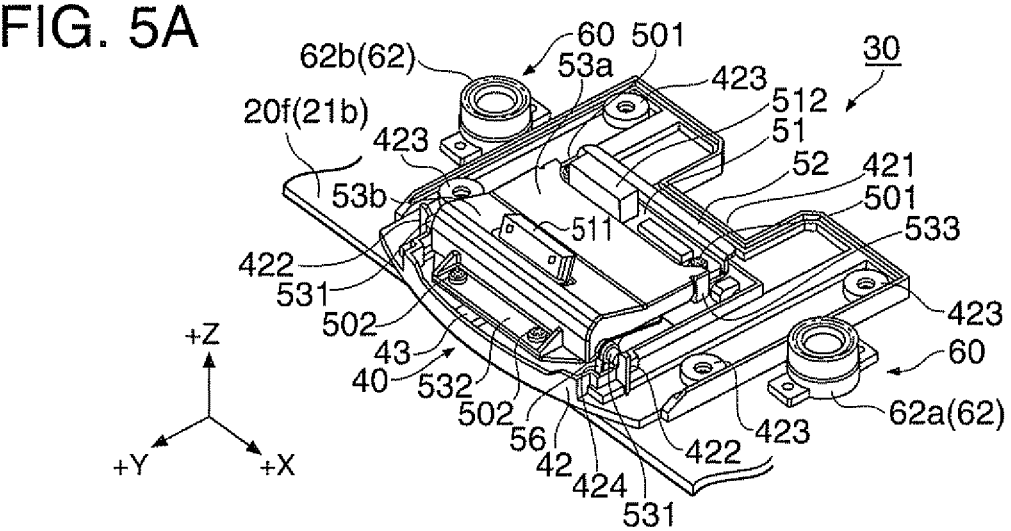
FIGS. 5A to 5C are schematic perspective views showing the housed state of the connecting unit in the first embodiment.
Figure 5B:
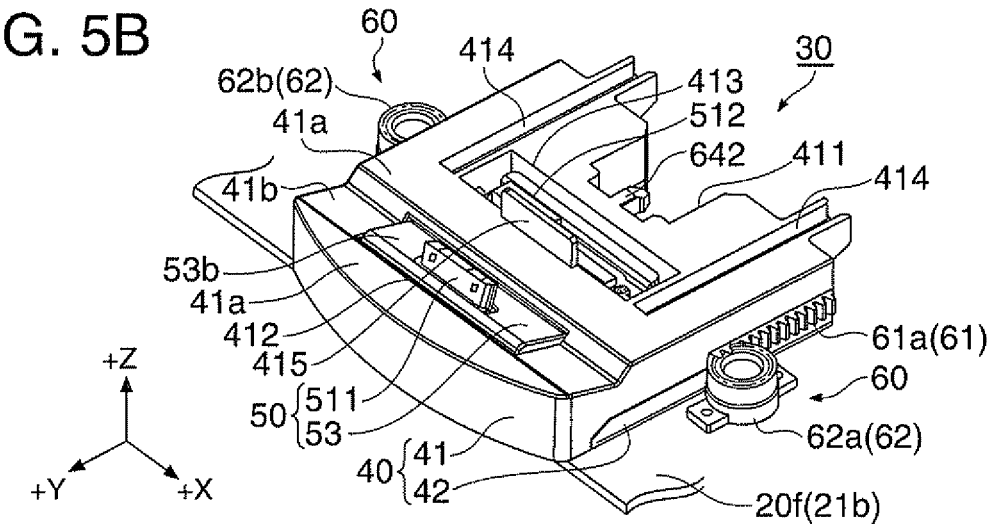
Figure 5C:
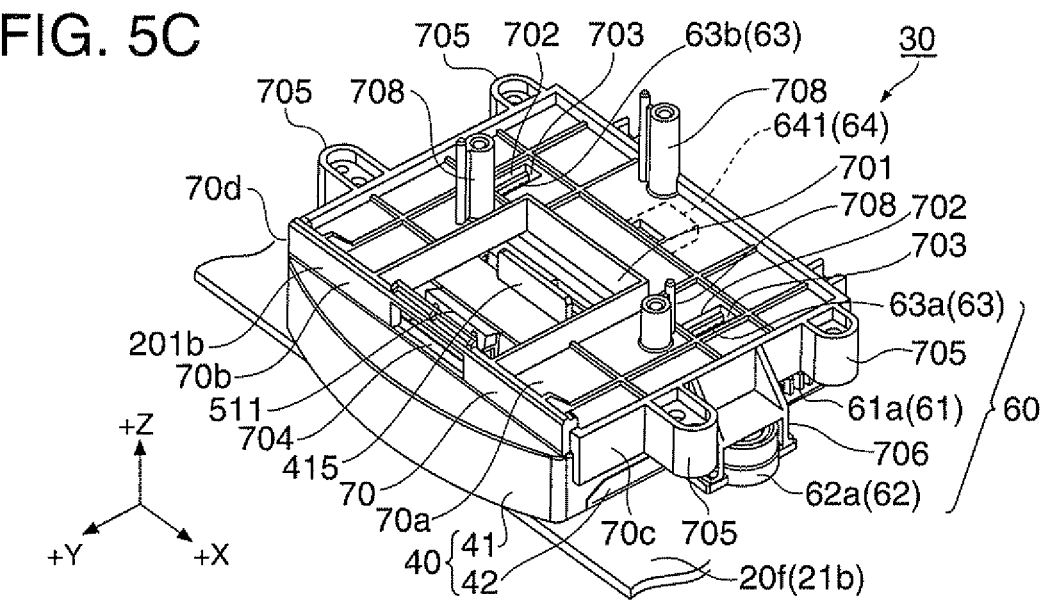

FIGS. 4A and 4B show the housed state of the connecting unit 30. FIG. 4A is a schematic side view of the connecting unit 30. FIG. 4B is a schematic plan view of the connecting unit 30. FIGS. 5A to 5C are schematic perspective views showing the housed state of the connecting unit 30. FIG. 5A is a perspective view of a lower case for movement 42 of the moving section 40 and the connecting section 50. FIG. 5B is a perspective view showing an upper case for movement 41 of the moving section 40 mounted on the structure shown in FIG. 5A. FIG. 5C is a perspective view showing a connection cover 70 for covering the connecting unit 30, mounted on the structure shown in FIG. 5B. The configuration of the connecting unit 30 will be described with reference to FIGS. 4A and 4B and FIGS. 5A to 5C.

The connecting unit 30 includes the connecting section 50 which connects the media player 100 in a manner that enables insertion and removal and has the media player 100 placed thereon, the moving section 40 which rotatably holds the connecting section 50, the slide mechanism section 60 as a driving mechanism section which drives (slides) the moving section 40 in a manner that enables sending-out of and sending-into the casing 20, and the like.

The moving section 40 includes the upper case for movement 41 and the lower case for movement 42. The lower case for movement 42 is formed in a substantially rectangular box shape. In the −Y direction on the lower case for movement 42, a cut-out section 421 is formed. In the +Y direction on the lower case for movement 42, a pair of holding sections 422 is formed which rotatably holds axis parts 531 of the connecting section 50, as will be described later. Also, at the center of a front-side end of the lower case for movement 42, a rotation regulating section 43 is formed protruding with a predetermined height, as a regulating section for regulating the angle at which the connector 511 is made to stand, as will be described later.

On the lateral sides in the left-right direction (X-axis direction) on the lower case for movement 42, slide racks 61 are formed. The slide racks 61 mesh with slide pinions 62 (62a, 62b) installed on the lower case 21b of the casing 20. The slide pinion 62 in this embodiment includes a so-called oil damper. The slide racks 61 and the slide pinions 62 form the slide mechanism section 60, which will be described later.

The upper case for movement 41 is formed in a box shape substantially similar to the lower case for movement 42, as shown in FIG. 4B and FIG. 5B. In the −Y direction on the upper case for movement 41, a cut-out section 411 is provided corresponding to the cut-out section 421 of the lower case for movement 42. In the cut-out section 411, an engaging protrusion 642 constituting the lack section 64 is formed, which will be described later. The engaging protrusion 642 is formed to protrude in the −Y direction from the cut-out section 411.

The upper case for movement 41 has screw holes (not shown) and is integrally fixed to the lower case for movement 42 by screws (not shown) via four screw guide sections 423 of the lower case for movement 42 (see FIG. 5A).

On a top side 41a of the upper case for movement 41, an inclined surface 41b inclined from the front side toward the rear side is formed. An opening 412 is formed on this inclined surface 41b. Also, an opening 413 is formed on the top side 41a toward the rear side from the opening 412. The one opening 412 exposes the front side including the connector 511 of the connecting section 50. The other opening 413 exposes a cable connector 512 or the like mounted on a circuit board 51 of the connecting section 50, as will be described later. The cable connector 512 connects a connection cable (not shown) for communicating signals from the connector 511 to a main board (not shown), via the opening 413.

On the top side 41a of the upper case for movement 41, a pair of recessed spring housing grooves 414 is formed on both sides of the opening 413, covering the portion from the center in the Y-axis direction to the end in the −Y direction. Slide springs 63, which will be described later, are housed respectively in the spring housing grooves 414. Also, on the top side 41a of the upper case for movement 41, a shielding section 415 is provided upright which closes a cut-out section 704 of the connection cover 70 as will be described later.

The connecting section 50 includes a connection frame 52 as a base, the circuit board 51 fixed to the connection frame 52, and a connection cover 53 fixed to the connection frame 52 so as to cover the connection frame 52. In this embodiment, the connection frame 52 is formed by bending a metallic plate member or the like. The circuit board 51 is a so-called rigid board. The connector 511 for connection with the media player 100, and the cable connector 512 for connecting the connection cable and the like are mounted on the circuit board 51. The connector 511 is mounted in an inclined state by approximately 15 degrees toward the casing 20 in relation to the direction perpendicular to the plane of the circuit board 51.

On a top side 53a of the connection cover 53, an inclined surface 53b inclined from the front side toward the rear side is formed. The connector 511 extends from this inclined surface 53b. The connector 511 extends substantially perpendicularly to the inclined surface 53b. When the connecting section 50 is assembled rotatably on the moving section 40, the front side including the connector 511 of the connecting section 50 is exposed from the opening 412 of the upper case for movement 41 by an energizing spring 56, which will be described later. The inclined surface 53b of the connecting section 50 protrudes by a predetermined amount from the inclined surface 41b of the upper case for movement 41 and is substantially parallel to the inclined surface 41b.

On the connection cover 53, a pair of axis parts 531 as rotation supporting sections which rotate in relation to the moving section 40 is formed on the lateral sides in the left-right direction (X-axis direction) on the front side, as shown in FIG. 5A. A fixed section 532 is formed at an end on the front side of the connection cover 53. Engaging pieces 533 are formed at both ends on the rear side.

In the case of assembling the connecting section 50, after the circuit board 51 is fixed to the connection frame 52 by screws 501, the connection cover 53 is fixed to the connection frame 52, as shown in FIG. 4B and FIG. 5B. More specifically, the engaging pieces 533 are engaged with the connection frame 52, and screws 502 are screwed into screw holes (not shown) in the connection frame 52 from screw guide holes (not shown) in the fixed section 532, thus fixing the connection cover 53 to the connection frame 52, as shown in FIG. 5A. The connecting section 50 is thus assembled.

In the case of holding the assembled connecting section 50 on the lower case for movement 42, the energizing springs 56 are attached to the pair of axis parts 531, respectively, and then the axis parts 531 are held on the holding sections 422 of the lower case for movement 42, as shown in FIG. 5A. The two energizing springs 56 are made up of torsion coil springs. After the energizing springs 56 are attached to the axis parts 531, respectively, one ends of the energizing springs 56 are inserted in grooves 424 of the lower case for movement 42 and the other ends are hooked on the bottom side of the connection frame 52 of the connecting section 50. The energizing springs 56 energize the connector 511 in a standing direction.

Thus, the inclined surface 53b of the connecting section 50 is substantially parallel to the inclined surface 41b of the upper case for movement 41, as shown in FIG. 4A and FIG. 5B. The connector 511 is at the initial angle (inclined approximately 15 degrees toward the casing 20 in relation to the +Z-axis direction (upward direction)). The connecting section 50 is rotatable about the axis parts 531 as supporting axes in relation to the moving section 40.

In this embodiment, the rotation regulating section 43 is formed in the moving section 40 (lower case for movement 42). The rotation regulating section 43 regulates rotation in a direction that the initial angle of the connector 511 is reduced (opposite to the casing 20), as shown in FIG. 4A. More specifically, the rotation regulating section 43 abuts on a forward lateral end of the connection frame 52 of the connecting section 50 and thus regulates the rotation of the connecting section 50, as shown in FIG. 4A and FIG. 5A.

In this embodiment, the maximum rotation angle of the connecting section 50 (connector 511) toward the casing 20 is regulated to approximately 30 degrees in relation to the +Z-axis direction (upward direction), as shown in FIG. 6A. Therefore, in this embodiment, the connector 511 is rotatable within a range of 15 to 30 degrees. The energizing springs 56 constantly energize the connecting section 50 to rotate opposite to the casing 20. The initial angle and the maximum rotation angle of the connector 511 are set to achieve overall optimality including size requirements of the connecting unit 30 and the media player 100 and the like.

The slide mechanism section 60 has the slide racks 61 formed on the right and left sides of the moving section 40 (lower case for movement 42) (slide rack 61a on the right lateral side (+X direction) and slide rack 61b on the left lateral side (−X direction)). The slide mechanism section 60 also has the slide pinions 62 (slide pinion 62a on the right (+X direction) and slide pinion 62b on the left (−X direction)) meshing with the slide racks 61. The slide pinions 62 made up of so-called oil dampers, as described above. The slide pinions 62 in the state of meshing with the slide racks 61 are screwed and fixed at predetermined positions on the lowercase 21b of the casing 20. The above two slide racks 61 (61a, 61b) are configured with similar specifications. The two slide pinions 62 (62a, 62b) too, are configured with similar specifications.

The slide mechanism section 60 has slide springs 63 (slide spring 63a on the right (+X direction) and slide spring 63b on the left (−X direction)) which give the moving section 40 an energizing force in the sending-out direction (+Y direction). The slide springs 63 are respectively housed in the spring housing grooves 414 of the upper case for movement 41 of the moving section 40, as shown in FIG. 4B. The two slide springs 63 (63a, 63b) are made up of compression coil springs and configured with similar specifications.

The connecting unit 30 has the connection cover 70 which covers the moving section 40 and the connecting section 50. As shown in FIG. 5C, the left-right direction (X-axis direction) and the up-down direction (Z-axis direction) of the connecting unit 30 are regulated by the connection cover 70 and the moving section 40 is enabled to move (slide) in the front-rear direction (Y-axis direction) by the slide mechanism section 60.

The connection cover 70 is formed in a rectangular box shape. On its top side 70a, an opening 701 is formed which escapes the connector 511 and the cable connector 512. The connection cover 70 also covers, from above, the pair of spring housing grooves 414 formed in the upper case for movement 41. In a portion thus covered, a pair of insertion holes 702 for inserting the slide spring 63 into the spring housing grooves 414 is formed. On the rear side (−Y direction) from the pair of insertion holes 72, fixed protrusions 703 which fix −Y direction lateral ends of the slide springs 63 so as not to move in the −Y direction are formed protruding into the spring housing grooves 414 from the interior surface side of the top side 70a.

Board fixing screw parts 708 for fixing the main board (not shown) situated above the connection cover 70 (+Z direction) are formed on the top side 70a of the connection cover 70. The main board is placed on the board fixing screw parts 708 and screws are inserted from the top side of the main board to screw the main board on the board fixing screw parts 708.

On the inner side from the opening 701 in the −Y direction on the top side 70a of the connection cover 70, a latch body 641 constituting the latch section 64 is installed facing the engaging protrusion 642 formed in the moving section 40 (upper case for movement 41).

A cut-out section 704 through which the connector 511 passes when the connector 511 moves is formed on a front side 70b of the connection cover 70. The front side 70b also constitutes the vertical surface 201b on the front side 20a of the casing 20.

Four screw guide sections 705 in total for fixing the connection cover 70 to fixing screw parts (not shown) formed protruding from the bottom side 20f of the lower case 21b are formed, two each on a right side 70c and on a left side 70d of the connection cover 70. A pinion holder 706 which holds, from above, the slide pinion 62 fixed to the lower case 21b is formed on each of the right side 70c and the left side 70d of the connection cover 70.

The connection cover 70 is placed on the fixing screw parts from above the moving section 40. Then, screws (not shown) are inserted from the screw guide sections 705 to screw the connection cover 70 to the fixing screw parts. Thus, the connection cover 70 is fixed to the bottom side 20f of the lower case 21b, covering the moving section 40. With this fixing, the slide pinions 62 are held by the pinion holders 706 from above. Thus, the moving section 40 is maintained in the state of being sandwiched between the bottom side 20f of the lower case 21b and the connection cover 70.

After fixing the connection cover 70 to the lower case 21b, the slide springs 63 are inserted into the spring housing grooves 414 from the insertion holes 702 (more specifically, inserted toward the +Y direction of the spring housing grooves 414) and are housed within the spring housing grooves 414.

With the above processes, the assembly of the connecting unit 30 is completed.

Figure 7A:
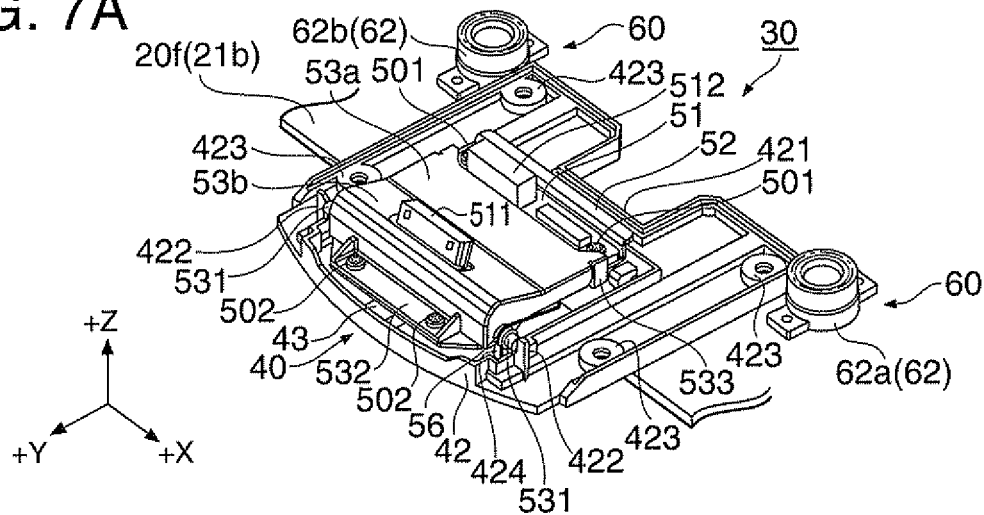
FIGS. 7A to 7C are schematic perspective views showing the sent-out state of the connecting unit in the first embodiment.
Figure 7B:
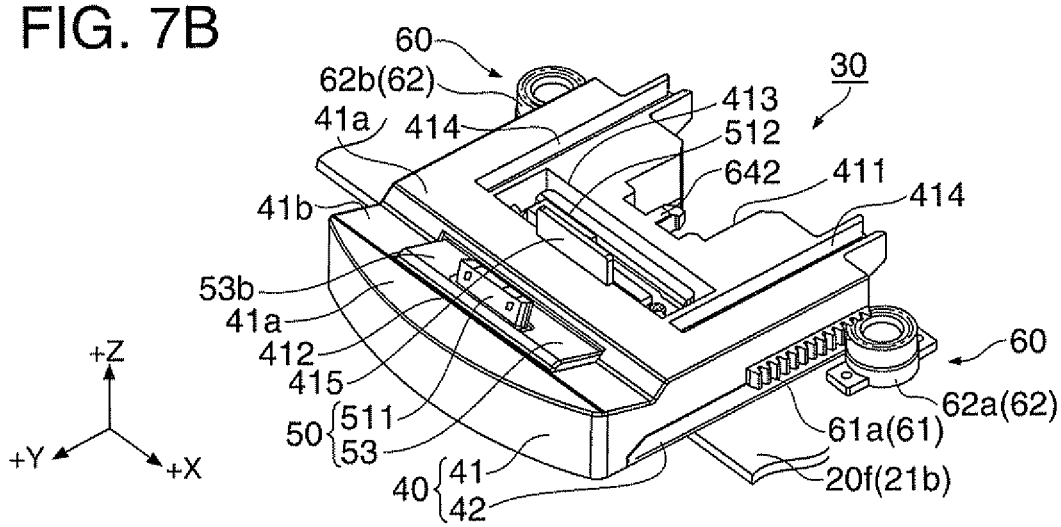
Figure 7C:
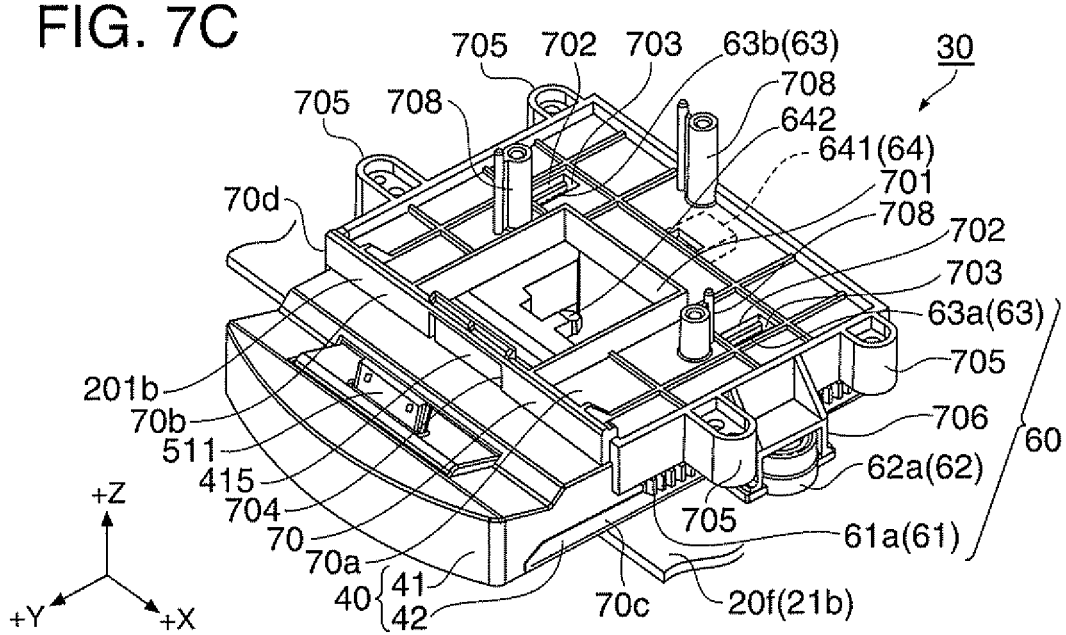

FIGS. 6A to 6C show the sent-out state of the connecting unit 30. FIG. 6A is a schematic side view of the state where the connecting section 50 is inclined to the maximum. FIG. 6B is a schematic side view where the connecting section 50 has a normal inclination. FIG. 6C is a schematic plan view of the connecting unit 30. FIGS. 7A to 7C are schematic perspective views showing the sent-out state of the connecting unit 30. FIG. 7A is a perspective view of the lower case for movement 42 of the moving section 40, and the connecting section 50. FIG. 7B is a perspective view showing the upper case for movement 41 of the moving section 40 mounted on the structure of FIG. 7A. FIG. 7C is a perspective view showing the connection cover 70 covering the connecting unit 30, mounted on the structure of FIG. 7B. The operation of the connecting unit 30 will be described with reference to FIGS. 4A and 4B to FIGS. 7A to 7C.

As shown in FIG. 4B, the latch section 64 includes the latch body 641 and the engaging protrusion 642, as described above. As the engaging protrusion 642 is inserted within the latch body 641, the latch section 64 becomes locked. As the latch section 64 is locked, the housed state is maintained.

In the housed state, the connecting unit 30 is already inserted within the casing 20 and only the forward end of the moving section 40 is protruding from the casing 20. The slide racks 61 of the slide mechanism section 60 are meshed with the slide pinions 62 at the +Y direction ends of the slide racks 61. The two slide springs 63 are compressed within their respective spring housing grooves 414 by the fixed protrusions 703 of the connection cover 70.

To shift the connecting unit 30 from the housed state shown in FIGS. 4A and 4B to the sent-out state shown in FIGS. 6A to 68, the forward end of the moving section 40 of the connecting unit 30 in the housed state is pressed (pushed) toward the casing 20 so that the latch section 64 is unlocked (the latch body 641 and the engaging protrusion 642 are disengaged from each other). When the latch section 64 is unlocked, the energizing force of the two slide springs 63 which are compressed causes the two slide racks 61 to start moving (sliding) in the forward direction (+Y direction) while meshing with their respective slide pinions 62.

With this operation, the moving section 40 starts sliding in the forward direction. The slide pinions 62 are made up of oil dampers as described above and are sent out with the sending-out speed controlled to a desired speed by the torque of the oil dampers.

A movement regulating section, not shown, is installed on the connecting unit 30 and regulates the amount of movement (amount of sending-out) of the moving section 40. Therefore, when the connecting unit 30 is sent out by a predetermined amount of movement, the movement of the moving section 40 is regulated by the movement regulating section and stops at that position. This state is the sent-out state shown in FIGS. 6A to 6C.

When the sent-out state is provided, the media player 100 is then connected to (inserted in) the connector 511. When the media player 100 is connected to the connector 511, the media player 100 is placed with the bottom side of the media player 100 abutting on the inclined surface 53b of the connecting section 50 (connection cover 53). Also, when the media player 100 is connected to the connector 511, the connector 511 is inclined about 15 degrees toward the casing 20 in relation to the +Z direction (upward direction), as shown in FIG. 6B. Therefore, the connector 511 rotates together with the connecting section 50 toward the casing 20 because of the weight of the media player 100.

The connecting section 50 is energized by an energizing force of the energizing springs 56 to rotate the connecting section 50 constantly opposite to the casing 20. However, the energizing force of the energizing springs 56 in this embodiment is set to be smaller than the energizing force rotating the connecting section 50 toward the casing 20 due to the weight of the media player 100. Therefore, the media player 100 and the connecting section 50 rotate toward the casing 20 against the energizing force of the energizing springs 56.

The media player 100 rotates toward the casing 20. The rear side 102 of the media player 100 abuts on the receiving section 25 installed on the casing 20 (front side 20a), and the media player 100 stops rotating, as shown in FIG. 3C. In this embodiment, the rotation angle of the connecting section 50 (connector 511) is variable from 15 to 30 degrees. The angle θ1 of the inclined surface 201a of the casing 20 (front side 20a) is set within this range.

In this embodiment, when the connecting section 50 (connector 511) is rotated to the maximum rotation angle of about 30 degrees, as shown in FIG. 6A, the inclined surface 53b of the connecting section 50 on which the bottom side of the media player 100 abuts protrudes in the upward direction (+Z direction) from the inclined surface 41b of the moving section 40. Therefore, even when the media player 100 is placed on the connecting section 50 and made to abut on the receiving section 25, the bottom side of the media player 100 does not abut on the inclined surface 41b of the moving section 40.

In this sent-out state, the projector 1 operates the media player 100, takes video information and audio information stored within the media player 100 into the projector 1, and carries out projection of videos and output of audios from the projector 1.

In the sent-out state, the shielding section 415 is situated at a position to close the cut-out section 704 of the connection cover 70 through which the connector 511 is passed, as shown in FIG. 7C. Thus, the appearance is improved.

Next, to shift the connecting unit 30 from the sent-out state to the housed state, first, the media player 100 connected to the connecting section 50 is detached from the connector 511. Thus, the connector 511 is returned to the initial angle again by the energizing springs 56.

Next, the forward end of the moving section 40 of the connecting unit 30 in the sent-out state continues to be pressed (pushed) toward the casing 20 (−Y direction). With this operation, the slide racks 61 rotate the slide pinions 62 in the opposite direction to the sending-out. Thus, the moving section 40 starts moving (being sent in) toward the casing 20. As the sending-in continues, the engaging protrusion 642 is inserted within the latch body 641 and the latch section 64 is locked. Thus, the connecting unit 30 is now in the housed state.

With the above operation, the series of operations of the connecting unit 30 is completed.

The above embodiment provides the following advantages.

According to the projector 1 of the embodiment, the connecting unit 30 for placing the media player 100 thereon is provided. When the connecting unit 30 is used, the moving section 40 can be sent out of the casing 20 by the slide mechanism section 60. When the connecting unit 30 is not used, the moving section 40 can be sent into the casing 20. Therefore, it suffices to expose the connecting section 50 outside only when the connecting unit 30 is used. Therefore, influence of external factors on the connection such as adherence of dust to the connecting section 50 (connector 511) can be reduced and reliability of electrical connection with the media player 100 can be improved. Moreover, the degree of freedom of design of the projector 1 can be improved.

According to the projector 1 of the embodiment, since the connecting section 50 has the connector 511 and the axis parts 531 as rotation supporting parts, the structure for carrying out connection with the media player 100 and rotation in relation to the moving section 40 can be realized easily.

According to the projector 1 of the embodiment, the connector 511 is installed with an initial angle. More specifically, the connector 511 is installed in the state of being inclined about 15 degrees as a predetermined angle toward the body of the projector 1 (toward the casing 20) from the vertical direction (+Z direction) in relation to the sending-out direction (+Y direction) of the moving section 40. Thus, the media player 100 can be connected easily to the connector 511. Moreover, the connected media player 100 can be rotated easily toward the casing 20.

According to the projector 1 of the embodiment, when the media player 100 is connected to the connector 511, the connector 511 is energized in the standing direction by the energizing springs 56 as energizing sections, and the connector 511 can thus be prevented from being inclined. Therefore, the media player 100 can be connected easily to the connector 511.

According to the projector 1 of the embodiment, since the rotation regulating section 43 as a regulating section is provided, the connector 511 can be regulated to an appropriate standing angle (in this embodiment, about 15 degrees as the initial angle) and held in this manner. Therefore, the media player 100 can be connected easily to the connector 511.

According to the projector 1 of the embodiment, when the connecting unit 30 is in the sent-out state, the connecting section 50 on which the media player 100 is installed rotates toward the case 20 because of the weight of the media player 100 against the energizing force of the energizing spring 56 energizing the connector 511 in the standing direction. Therefore, media player 100 can be made to abut on the casing 20 (receiving section 25). Thus, concentration of stress on the connecting section 50 (connector 511) can be reduced and stable fixing of the connected media player 100 can be realized. Moreover, since the media player 100 can be fixed stably, the keys 103 on the media player 100 can be operated securely and stable transmission of information to and from inside the projector 1 can be realized. Thus, stable projection and audio output or the like from the projector 1 can be carried out.

According to the projector 1 of the embodiment, as the slide mechanism section 60 slides the moving section 40, stable sending-out can be carried out. Also, since the slide mechanism section 60 includes the slide racks 61, the slide pinions 62 and the slide springs 63, the slide mechanism section 60 can be realized with a simple configuration.

According to the projector 1 of the embodiment, since the receiving section 25 is provided, the media player 100 placed on the connecting section 50 is made to abut on the receiving section 25, thus enabling mechanical stable placing (fixing) and electrically stable connection of the media player 100. Therefore, reliability of electrical and mechanical connection between the media player 100 and the connecting section 50 (projector 1) can be improved.

According to the projector 1 of the embodiment, the slide mechanism section 60 includes the pair of slide racks 61 (61a, 61b), the pair of slide pinions 62 (62a, 62b) meshing with the slide racks 61, and the pair of slide springs 63 (63a, 63b). Thus, sliding of the moving section 40 for sending-out and sending-in can be stabilized.

According to the projector 1 of the embodiment, since the slide pinions 62 (62a, 62b) are made up of oil dampers, the sending-out speed can be adjusted to a desired speed.

Second Embodiment

Next, a second embodiment will be described.

Figure 9A:
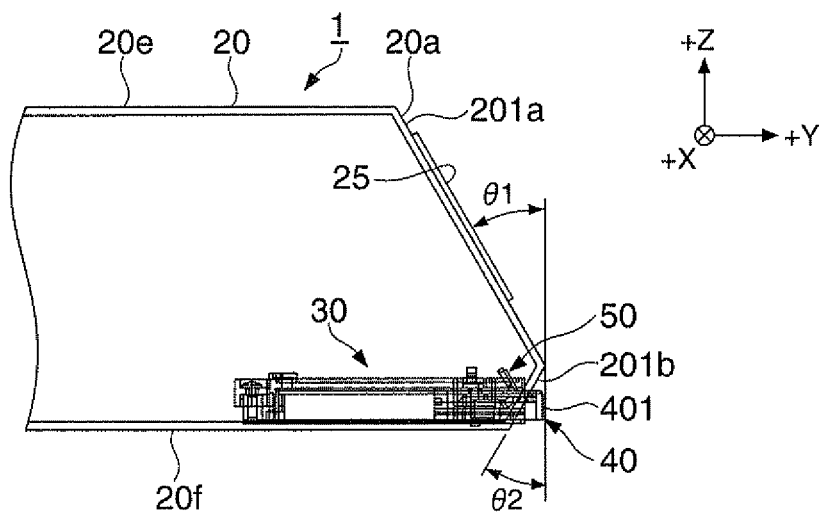
FIGS. 9A to 9C are schematic side sectional views showing a projector in the second embodiment.
Figure 9B:
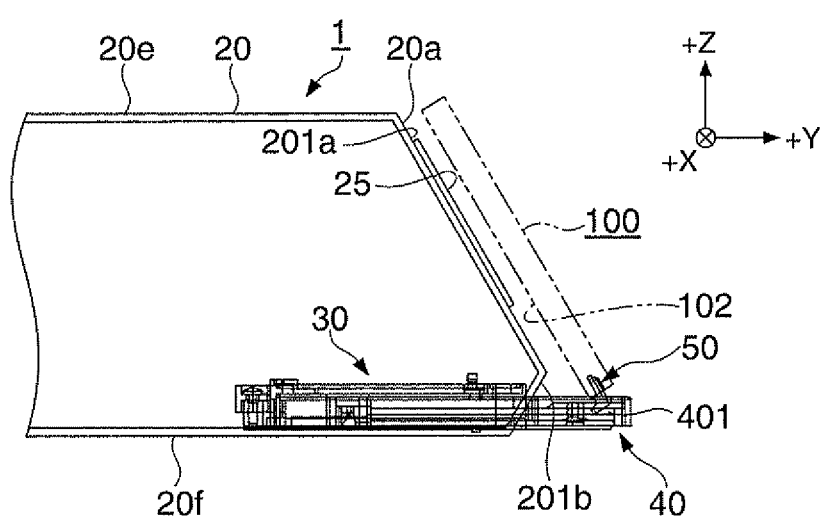

As shown in FIG. 9A, the front side 20a includes the inclined surface 201a having an angle θ1 in relation to the Z-axis direction, and the inclined surface 201b having an angle θ2 toward the bottom sides 20f. The connecting unit 30 on which the media player 100 is placed is installed in such a manner that the media player 100 is situated substantially at the center of the front side 20a. When the media player 100 is placed on the connecting unit 30, the media player 100 is inclined substantially parallel to the inclined surface 201a (with the angle θ1), as shown in FIG. 9B. This angle θ1 is set in consideration of easiness for the user to place the media player 100 on the connecting unit 30 and viewability of the display section 101 of the media player 100 when placed, and the like.

The casing 20 is divided by the XY plane passing through the boundary between the inclined surface 201a and the inclined surface 201b. The casing 20 includes the upper case 21a constituting the casing 20 in the upward direction (+Z direction), the lower case 21b constituting the casing 20 in the downward direction (−Z direction), and the rear case 21c constituting the casing 20 on the rear side 20b.

Figure 8:
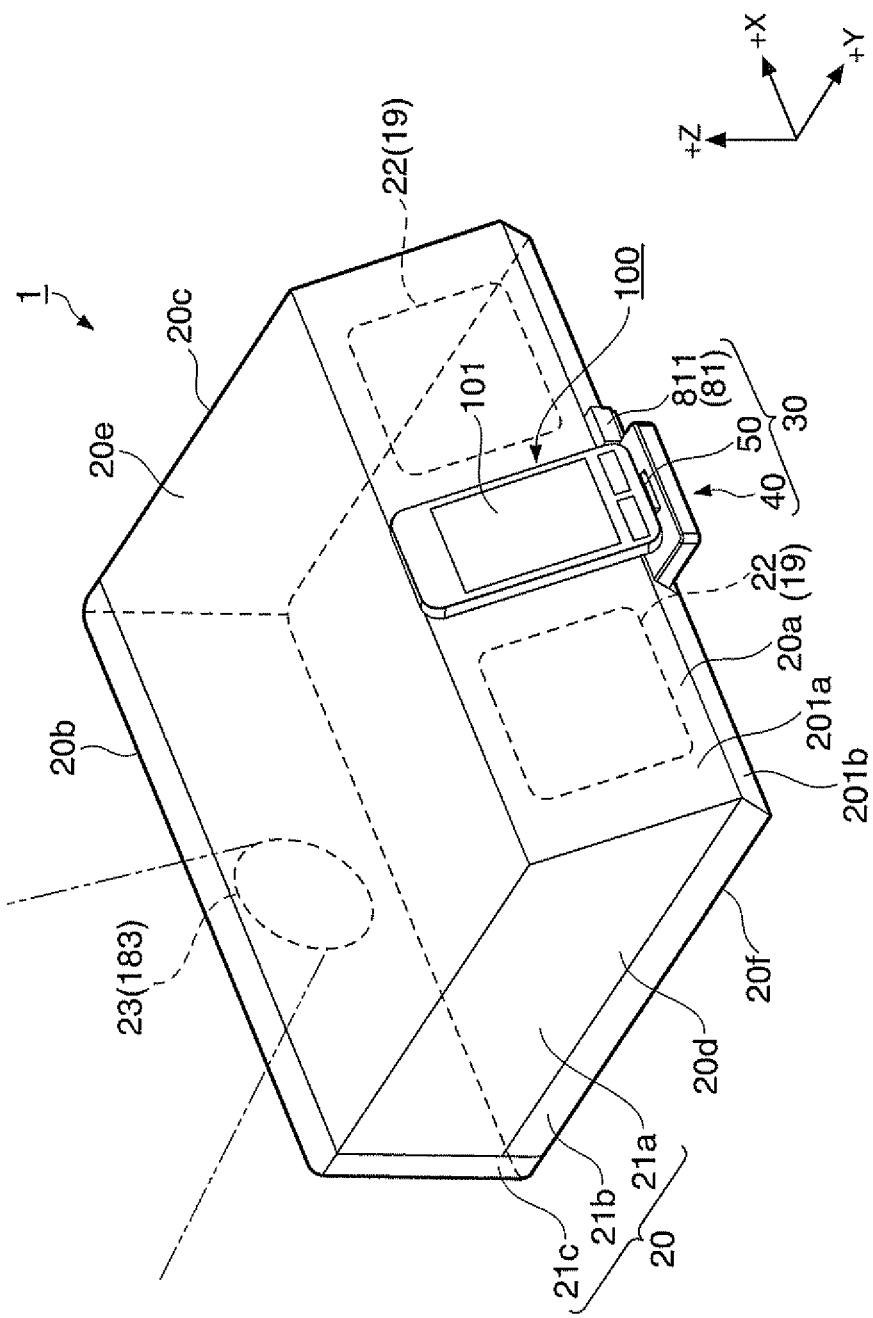
FIG. 8 is a schematic perspective view showing the state where a media player is installed on a connecting unit in a second embodiment.

The connecting unit 30 is installed within the casing 20 (lower case 21b), along the bottom side 20f substantially at the center of the inclined surface 201b forming the lower part of the front side 20a. The connecting unit 30 also includes the moving section 40 which connects the media player 100 and has the media player 100 placed thereon, and an operation section 81 installed beside the moving section 40, or the like, as shown in FIG. 8.

In the projector 1, the speaker 22 constituting the audio output unit 19 is installed within the casing 20 (upper case 21a) on the front side 20a (inclined surface 201a) in the left-right direction where the media player 100 is installed and the media player 100 outputs audio. Also, in the projector 1, the projection lens 23 constituting the projection lens unit 183 is installed within the casing 20 (rear case 21c) on the rear side 20b and a video is projected in the −Y direction from the media player 100.

As shown in FIG. 9A, when the media player 100 is not used, the moving section 40 is in the sent-in state within the projector 1. In the following description, the position of the moving section 40 in this state will be referred to as "housed position" when appropriate. In this housed position, the moving section 40 and an operation switch 1811 cannot be visually recognized if the projector 1 is viewed from the top side 20e of the projector 1.

As the operation switch 1811 constituting the operation section 81 is pressed, the moving section 40 is slid and sent out in the external direction (+Y direction) in relation to the body of the projector 1 from the housed position, as shown in FIG. 9B. FIG. 9B shows the state where the moving section 40 is sent out to the maximum. In the following description, the position of the moving section 40 in this state will be referred to as "maximum sent-out position" when appropriate. After the moving section 40 is sent out to the maximum sent-out position, the media player 100 is connected to the connecting section 50 of the moving section 40. Thus, the media player 100 is placed on the moving section 40.

As a forward end 401 of the moving section 40 is pressed and pushed back toward the front side 20a (−Y direction) from the state where the media player 100 is placed on the moving section 40 at the maximum sent-out position, the moving section 40 starts sliding toward the front side 20a of the body of the projector 1. Then, the pushing back of the moving section 40 is stopped at a position where the rear side 102 of the media player 100 abuts on the receiving section 25 formed on the inclined surface 201a of the front side 20a. With this operation, the moving section 40 is locked at that position by an adjustment mechanism section 80 (see FIGS. 10A and 10B) which will be described later. As this state is provided, the installation of the media player 100 on the moving section 40 is completed. This position is the position where the media player 100 is used. In the following description, the position of the moving section 40 will be referred to as "use position" when appropriate.

Figure 11A:
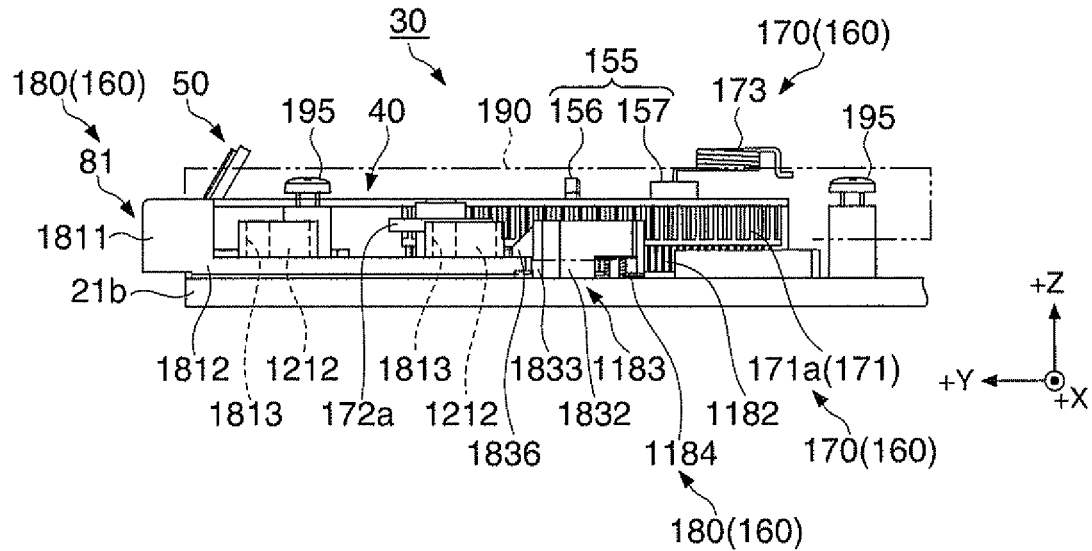
FIGS. 11A and 11B are schematic perspective views showing the housed state of the connecting unit in the second embodiment.
Figure 11B:
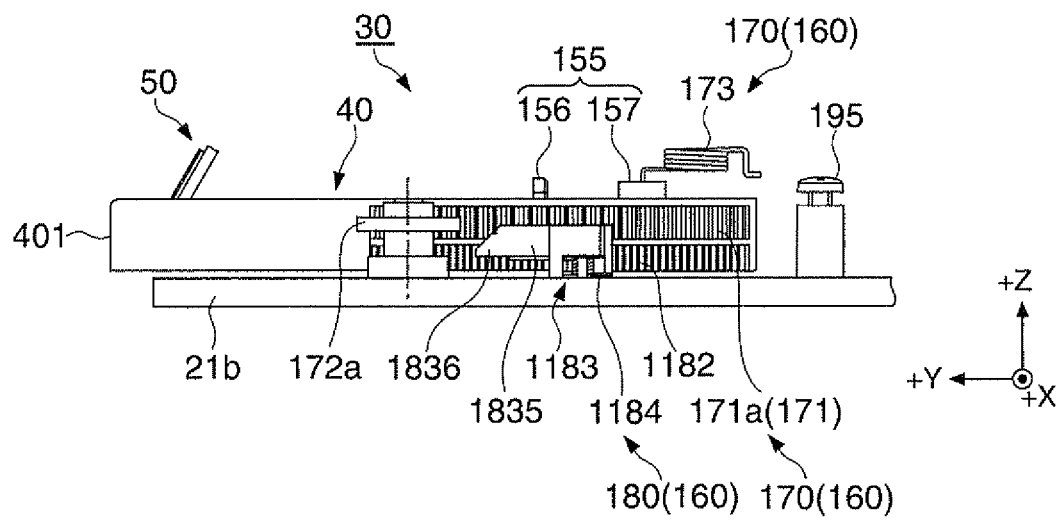

FIGS. 10A and 10B are schematic plan views showing the housed position of the connecting unit 30. FIG. 10A is a schematic plan view showing an adjustment rack 1182. FIG. 10B is a schematic plan view showing the overall configuration of the connecting unit 30. FIGS. 11A and 11B are schematic side views at the housed position of connecting unit 30. FIG. 11A is a schematic side view along A-A' in FIG. 10B. FIG. 11B is a schematic side view along B-B' in FIG. 10B. The configuration of the connecting unit 30 will be described with reference to FIGS. 10A and 10B and FIGS. 11A and 11B.

As shown in FIG. 10B, the connecting unit 30 includes the moving section 40 which removably places the media player 100 thereon, and a driving mechanism section 160 which drives the moving section 40 in a manner that enables sending-out of and sending-into the body of the projector 1. The driving mechanism section 160 has a slide mechanism section 170 which drives the moving section 40 to slide, and the adjustment mechanism section 180 which adjusts the amount of slide of the moving section 40.

The slide mechanism section 170 has a pair of slide racks 171 (171a, 171b) installed on both lateral sides of the moving section 40 along the sending-out direction (+Y direction) of the moving section 40. The slide mechanism section 170 also has slide pinions 172 (172a, 172b) meshing with the slide racks 171a, 171b, respectively. The slide mechanism section 170 also has a slide spring 173 as a driving source which gives the moving section 40 an energizing force in the sending-out direction and thus causes the moving section 40 to slide.

The adjustment mechanism section 180 has the adjustment rack 1182 (FIG. 10A) installed in a lower part (in the −Z direction) on the lateral side in the +X direction of the moving section 40, along the sending-out direction (+Y direction) of the moving section 40. The adjustment mechanism section 180 also has the operation section 81 which operates the slide mechanism section 170 and locks the operation of the slide mechanism section 170.

The adjustment mechanism section 180 also has an adjustment lever 1183 which includes an abutment lever 1832 having an abutment part 1833 abutting on the operation section 81, and a lock lever 1835 having a lock part 1836 meshing with the adjustment rack 1182. This adjustment lever 1183 follows the operation of the operation section 81. The adjustment mechanism section 180 also has an adjustment spring 184 which follows the operation of the adjustment lever 1183 and which gives an energizing force in a direction of returning the operation section 81 to its initial position and gives an energizing force in a direction of meshing the lock part 1836 with the adjustment rack 1182. The slide mechanism section 170 and the adjustment mechanism section 180 operate in an interlocked manner.

Next, each section of the configuration will be described in detail.

The moving section 40 is formed in a rectangular plate shape and includes the connecting section 50 which electrically connects with the media player 100, and a guide section 155 which guides a flexible cable (not shown) connecting the connecting section 50 with the video-audio signal processing unit 16. The guide section 155 includes a sending-out regulating section 156 which regulate sending-out of the moving section 40 at the maximum sent-out position, and a sending-in regulating section 157 which regulates sending-in of the moving section 40 at the housed position. On the sending-in regulating section 157, a spring guide hole 158 is formed which rotatably guides and fixes one end of the slide spring 173.

The moving section 40 also includes the slide racks 171 (171a, 171b) in the upper parts (+Z direction) on both lateral sides (+X side and −X side), and the adjustment rack 1182 in the lower part (−Z direction) on the lateral side in the +X direction, as shown in FIGS. 11A and 11B. The adjustment rack 1182 is formed specifically below and in line with slide rack 171a.

The slide pinions 172 (172a, 172b) are provided on both lateral sides of the moving section 40 and rotatably installed on pins 1211, respectively, provided upright on the lower case 21b. Thus, the slide pinion 172a meshes with the slide rack 171a, and the slide pinion 172b meshes with the slide rack 171b.

The moving section 40 is installed in a housing space surrounded by the lower case 21b and a moving section cover 190 installed to cover the upward direction (+Z), the left-right direction (X-axis direction) and the −Y direction of the moving section 40. The moving section cover 190 is fixed to the lower case 21b by four screws 195 and holds the slide pinions 172 and the adjustment lever 1183 from above.

On the moving section cover 190, a spring guide hole 191 is formed which rotatably guides and fixes the other end of the slide spring 173, as shown in FIG. 10B. On the moving section cover 190, a connection escape section 192 is formed in a manner of escaping the connecting section 50. Also, on the moving section cover 190, an opening 193 corresponding to the guide section 155 of the moving section 40 is formed. The opening 193 allows the sending-out regulating section 156 and the sending-in regulating section 157 protruding in the guide section 155 to extend, and is formed with a size corresponding to the amount of slide of the guide section 155 following the slide of the moving section 40. In the state where the moving section 40 is situated at the housed position, the sending-in regulating section 157 is abutting on a side part 1931 in the −Y direction of the opening 193.

The slide spring 173 is made up of a torsion coil spring. The slide spring 173 is installed in an upper part (+Z direction) of the moving section cover 190. The slide spring 173 has its one end inserted in the spring guide hole 158 of the sending-in regulating section 157 and has its other end inserted in the spring guide hole 191 of the moving section cover 190. The slide spring 173 is installed with an energizing force in the direction of sending out the moving section 40.

The operation section 81 has the operation switch 1811 protruding from the casing 20, and an extension part 1812 extending along the lower case 21b from the operation switch 1811. On the extension part 1812, two elongate slots 1813 are formed which are slidable in the sending-out direction (Y-axis direction) by being guided by two pins 1212 provided upright on the lower case 21b.

The adjustment lever 1183 has an axis part 1831 installed rotatably on the lower case 21b, the abutment lever 1832 extending from the axis part 1831, and the lock lever 1835. At a distal end of the abutment lever 1832, the abutment part 1833 abutting on an end of the extension part 1812 of the operation section 81 is provided, as described above. At a distal end of the lock lever 1835, the lock part 1836 meshing with the adjustment rack 1182 is provided, as described above.

The adjustment spring 184 is made up of a torsion coil spring. The adjustment spring 184 is installed on the axis part 1831 of the adjustment lever 1183. The adjustment spring 184 has its one end guided by two protrusions 1213 protruding on the lower case 21b and has its other end hooked and fixed on the lock lever 1835. The adjustment spring 184 is installed with an energizing force in a direction of causing the lock part 1836 to mesh with the adjustment rack 1182 and also causing the abutment part 1833 to abut on the end of the extension part 1812.

As shown in FIGS. 10A and 10B and FIGS. 11A and 11B, when the moving section 40 is at the housed position, the adjustment spring 184 causes the lock part 1836 of the adjustment lever 1183 to mesh with the adjustment rack 1182, thus regulating the sliding of the moving section 40 in the sending-out direction. Moreover, when the moving section 40 is at the housed position, the adjustment spring 184 causes the abutment part 1833 of the adjustment lever 1183 to abut on the extension part 1812 of the operation section 81, thus energizing the operation section 81 in the +Y direction. Thus, the −Y direction side parts of the elongate slots 1813 of the operation section 81 abut on the pins 1212, thereby regulating the operation switch 1811 in the protruding state from the casing 20 (initial position).

Figure 12:
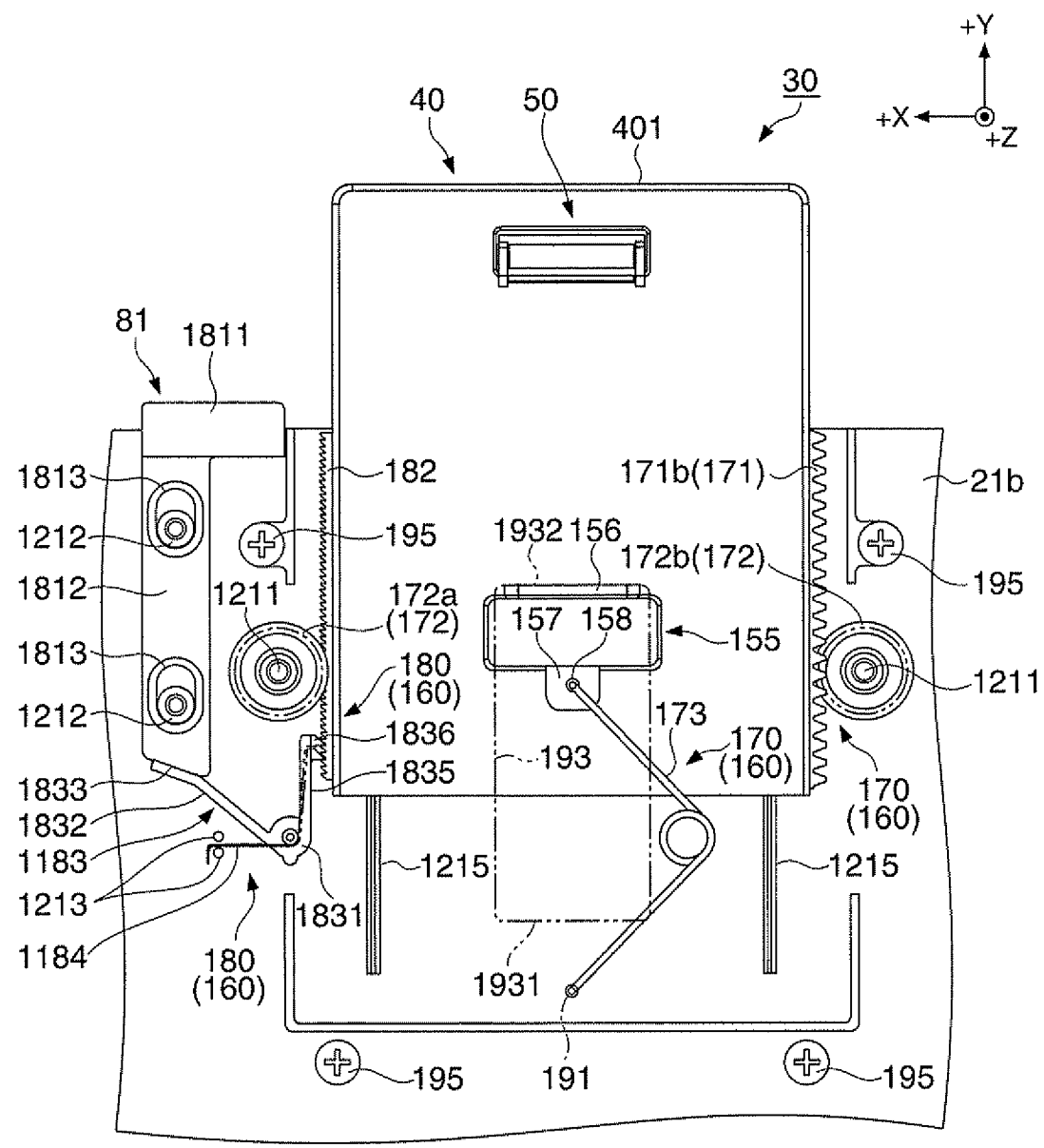
FIG. 12 is a schematic plan view showing a maximum sent-out position of the connecting unit in the second embodiment.

FIG. 12 is a schematic plan view showing the maximum sent-out position of the connecting unit 30. In FIG. 12, the slide rack 171a on the +X side is not shown, for convenience of explanation. The operation of the driving mechanism section 160 up to the point where the moving section 40 is sent out (slid) to the maximum sent-out position from the housed position will be described with reference to FIGS. 10A and 10B, FIGS. 11A and 11B, and FIG. 12.

First, in the state where the moving section 40 is situated at the housed position (the position shown in FIGS. 10A and 10B and FIGS. 11A and 11B), the operation section 81 is operated. Actually, the operation switch 1811 is pressed and pushed in the direction of the casing 20. With this operation, the operation section 81 moves along the pins 1212 toward the inside of the casing 20 (−Y direction).

With the movement of the operation section 81, the abutment part 1833 of the adjustment lever 1183 abutting on the end of the extension part 1812 is moved in the −Y direction. Thus, the adjustment lever 1183 rotates in the +X direction about the axis part 1831 against the energizing force of the adjustment spring 184. With this operation, the lock part 1836 is unmeshed from the adjustment rack 1182.

When the lock part 1836 is unmeshed from the adjustment rack 1182, the moving section 40 starts sliding in the sending-out direction (+Y direction) by the energizing force of the slide spring 173. The moving section 40 slides, causing the slide pinion 172a meshing with the slide rack 171a and the slide pinion 172b meshing with the slide rack 171b to rotate. An energizing member (not shown) which regulates rotation speed is installed on the slide pinions 172a and 172b, and the energizing member regulates the sending-out speed (sliding speed) of the moving section 40 to a predetermined speed. The moving section 40 is guided to slide by a pair of slide guide protrusions 1215 formed on the lower case 21b.

The moving section 40 slides in the sending-out direction as described above and the sending-out regulating section 156 of the moving section 40 abuts on a side part 1932 of the opening 193 (moving section cover 190) as shown in FIG. 12, thus regulating the sliding of the moving section 40. If the pressing of the operation switch 1811 is stopped in this state, the energizing force of the adjustment spring 184 causes the adjustment lever 1183 to rotate in the −X direction about the axis part 1831. With this operation, the lock part 1836 meshes with the adjustment rack 1182. The abutment part 1833 presses the extension part 1812. With this operation, the movement of the moving section 40 is locked and the operation switch 1811 (operation section 81) is returned to the initial position. The position of the moving section 40 in this state is the maximum sent-out position, which is also shown in FIG. 9B.

In the state where the moving section 40 is at the maximum sent-out position, the media player 100 to be connected with the projector 1 is inserted in the connecting section 50. The connecting section 50 is installed on the moving section 40 with a similar angle to the angle θ1 (see FIG. 9A) of the inclined surface 201a on the front side 20a. When a connecting section (not shown) installed on the media player 100 is inserted in the connecting section 50, the media player 100 stands on the moving section 40 with the angle θ1 (see FIG. 9B).

Figure 13:
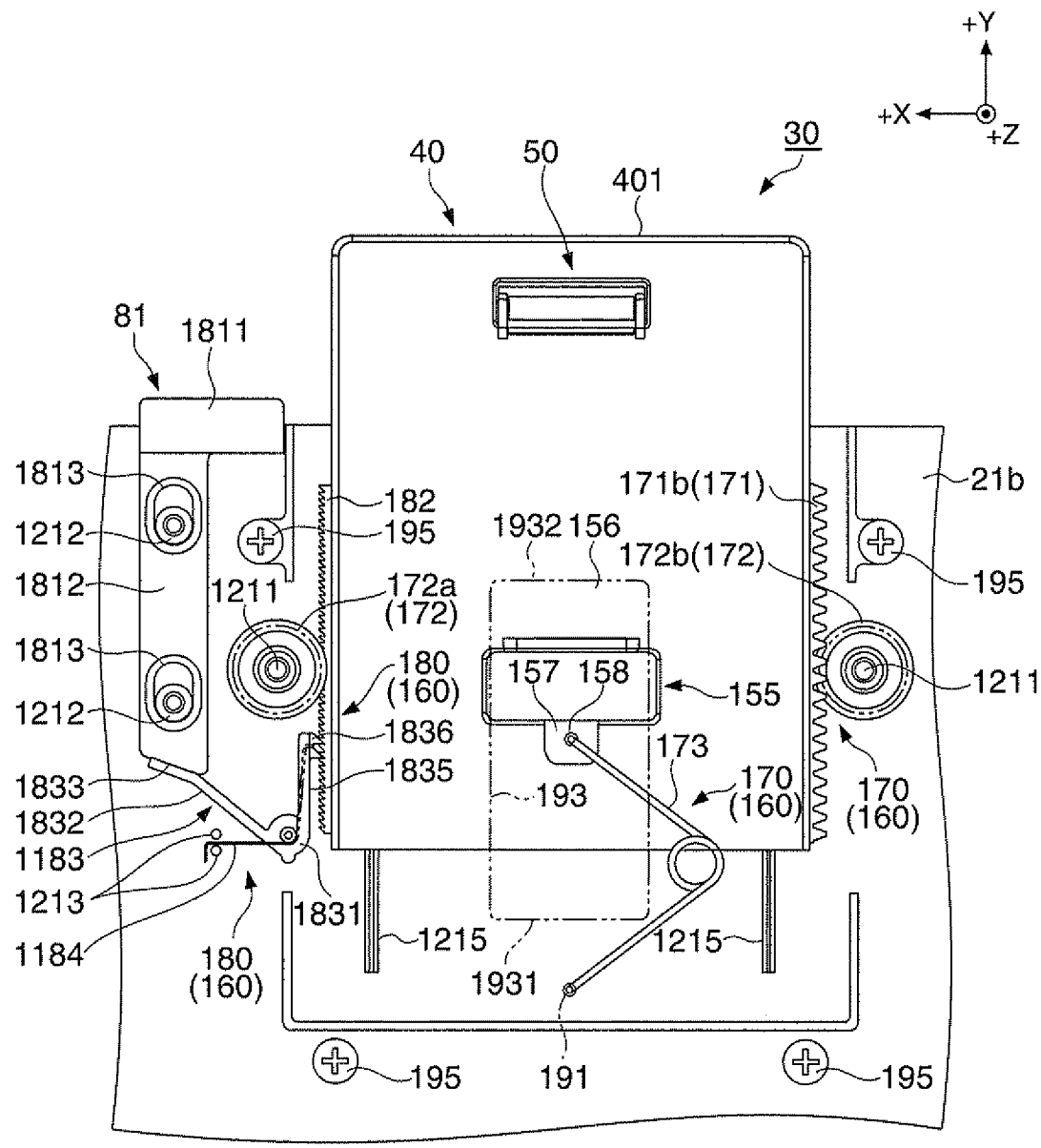
FIG. 13 is a schematic plan view showing a use position of the connecting unit in the second embodiment.

FIG. 13 is a schematic plan view showing the use state of the connecting unit 30. In FIG. 13, as in FIG. 12, the slide rack 171a on the +X side is not shown for convenience of explanation. The operation of the driving mechanism section 160 up to the point where the moving section 40 is sent in (slid) to the use position from the maximum sent-out position will be described with reference to FIG. 12 and FIG. 13.

First, in the state where the moving section 40 is situated at the maximum sent-out position (the position shown in FIG. 12), the forward end 401 of the moving section 40 is pressed and pushed back toward the front side 20a (−Y direction). With this operation, the adjustment rack 1182 also moves in the sending-in direction (−Y direction). At this point, the lock part 1836 of the lock lever 1835 meshing with the adjustment rack 1182 is released.

The gear shape of the adjustment rack 1182 and the gear shape of the lock part 1836 are formed so that the respective gears can slide in relation to the movement in the sending-in direction and get over distal ends of the respective gear shapes. Meanwhile, the gear shapes are formed so that the gears mesh with each other completely as described above in relation to the movement in the sending-out direction (+Y direction).

Therefore, even when the lock part 1836 is energized toward the adjustment rack 1182 by the adjustment spring 184, if the adjustment rack 1182 is pressed in the sending-in direction against the energizing force, the lock part 1836 is released. With this operation, the moving section 40 starts sliding in the sending-in direction.

The moving section 40 slides, causing the slide pinion 172a meshing with the slide rack 171a and the slide pinion 172b meshing with the slide rack 171b to rotate. The rotating direction is the reverse of the rotating direction where the moving section 40 slides from the housed position to the maximum sent-out position.

Figure 9C:
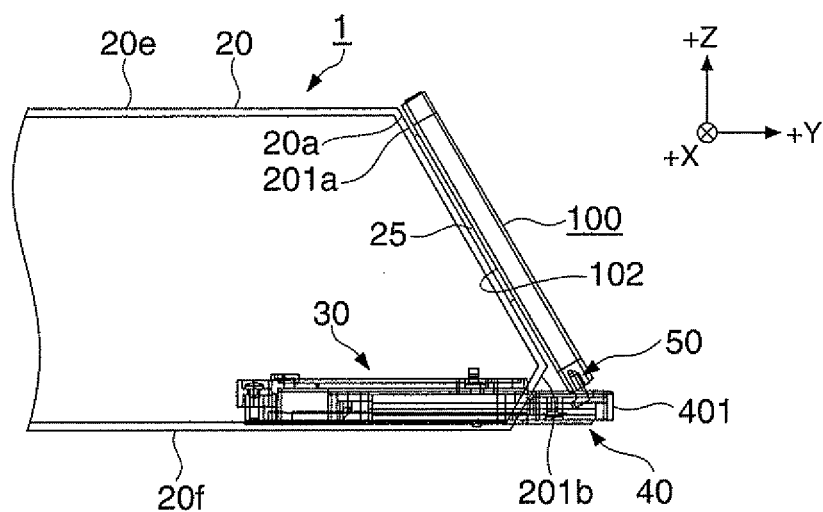

Then, in the state where the rear side 102 of the media player 100 is abutting on the receiving section 25 formed on the inclined surface 201a, as shown in FIG. 9C, the pressing of the forward end 401 of the moving section 40 is stopped. With this operation, the lock part 1836 meshes with the adjustment rack 1182 again, as shown in FIG. 13, and the movement of the moving section 40 is thus locked. The position of the moving section 40 in this state is the use position, which is also shown in FIG. 9C. At this use position, the projector 1 takes in video data and audio data outputted from the media player 100.

To detach the media player 100 from the connecting section 50, first, the moving section 40 is returned to the maximum sent-out position from the use position. More specifically, the operation switch 1811 is pressed to operate the driving mechanism section 160 as described above. Thus, the moving section 40 is sent out (slid) to the maximum sent-out position from the use position. Then, the media player 100 is detached from the connecting section 50.

To house the moving section 40 within the casing 20 after the media player 100 is detached, the moving section 40 is returned from the maximum sent-out position to the housed position. More specifically, the forward end 401 of the moving section 40 is pressed to operate the driving mechanism section 160 as described above. Thus, the moving section 40 is slid in the sending-in direction. If the forward end 401 continues being pressed, the sending-in regulating section 57 of the moving section 40 abuts on the side part 1931 of the opening 193 (moving section cover 190) as shown in FIG. 10B, thus regulating the sliding of the moving section 40. In this state, the pressing of the forward end 401 of the moving section 40 is stopped. With this operation, the lock part 1836 meshes with the adjustment rack 1182 again, as shown in FIG. 10A. Thus, the movement of the moving section 40 is locked and the position of the moving section 40 can be returned to the housed position.

With the above operation, the series of operation of the connecting unit 30 is completed.

The above embodiment has the following advantages.

According to the projector 1 of the embodiment, with the driving mechanism section 160, for example, the moving section 40 having the connecting section 50 is sent out of the body of the projector 1 when the connecting unit 3 is used, and the moving section 40 is sent into the body of the projector 1 when the connecting unit 30 is not used. Thus, it suffices to expose the connecting section 50 outside only when the connecting unit 30 is used. Therefore, influence of external factors on the connection such as adherence of dust to the connecting section 50 can be reduced and reliability of connection with the media player 100 can be improved. Moreover, the degree of freedom of design of the projector 1 can be improved as well.

According to the projector 1 of the embodiment, as the moving section 40 is slid by the slide mechanism section 170, stable sending-out operation can be carried out.

According to the projector 1 of the embodiment, since the slide mechanism section 170 includes the slide racks 171, the slide pinions 172 and the slide spring 173, the slide mechanism section 170 can be realized with a simple configuration.

According to the projector 1 of the embodiment, as the adjustment mechanism section 180 adjusts the amount of slide of the moving section 40, the media player 100 connected to the connecting section 50 can be slid to an optimum position. Thus, stable placement and connection of the media player 100 can be realized.

According to the projector 1 of the embodiment, the adjustment mechanism section 180 includes the adjustment rack 1182, the operation unit 181, the adjustment lever 1183 and the adjustment spring 184. By the operation of the operation unit 181, the adjustment rack 1182 and the lock part 1836 of the adjustment lever 1183 are unlocked from each other, thus allowing the moving section 40 to slide. Also, when the operation of the operation section 81 is stopped, the adjustment rack 1182 and the lock part 1836 of the adjustment lever 1183 mesh with each other, thus fixing the moving section 40. Thus, the adjustment mechanism section 180 can be realized with a simple configuration and the amount of slide of the moving section 40 can be adjusted securely.

According to the projector 1 of the embodiment, by a simple operation of pressing the moving section 40 in the sending-in direction with the lock part 1836, the amount of slide can be adjusted so that the position of the media player 100 placed on the moving section 40 reaches a desired position. After the adjustment, as the movement in the sending-out direction is locked, the media player 100 can be placed stably.

According to the projector 1 of the embodiment, the moving section 40 is slid to the position where the media player 100 placed on the moving section 40 abuts on the receiving section 25. Thus, more stable placement and connection of the media player 100 can be realized.

According to the projector 1 of the embodiment, the slide mechanism section 170 includes the pair of slide racks 171 (171a, 171b) and the pair of slide pinions 172 (172a, 172b) meshing with the slide racks 171. Thus, the sliding operation for sending out and sending in the moving section 40 can be stabilized.

According to the projector 1 of the embodiment, the pair of slide racks 171 (171a, 171b) constituting the slide mechanism section 170 are provided on both lateral sides of the moving section 40, and the adjustment rack 1182 constituting the adjustment mechanism section 180 is provided below and in line with the slide rack 171a, on the lateral side of the moving section 40. This configuration enables reduction in thickness of the connecting unit 30 and also enables reduction in thickness of the projector 1.

Without being limited to the above embodiments, various changes and improvements can be additionally made within the scope of the invention. Examples of such modifications will be given hereinafter.

In the projector 1 of the embodiments, information stored within the media player 100 connected with the connecting unit 30 can be communicated with the inside of the projector 1 by operating the keys 103 on the media player 100. However, without being limited to this example, information can also be communicated by operating the operation panel 11 installed on the body of the projector 1 or operating a remote controller or the like.

In the projector 1 of the embodiment, the connector 511 is installed at a predetermined initial angle. More specifically, the connector 511 is installed, being inclined about 15 degrees as a predetermined angle toward the casing 20 from the vertical direction (+Z direction) in relation to the sending-out direction of the moving section 40 (+Y direction). However, without being limited to this example, it suffices that the connector 511 is inclined toward the casing 20 from the vertical direction (+Z direction) and the angle may be properly set in consideration of easiness of connection of the media player 100 to the connector 511. Similarly, while the angle of approximately 30 degrees is given as the maximum rotation angle of the connector 511, the angle need not be limited to this and can be properly set.

In the projector 1 of the embodiment, the connector 511 is mounted, being inclined about 15 degrees toward the casing 20 in relation to the vertical direction of the surface of the circuit board 51. However, without being limited to this example, the connector 511 may be mounted perpendicularly to the surface of the circuit board 51 and the circuit board 51 may be inclined about 15 degrees toward the casing 20 in relation to the horizontal direction.

In the projector 1 of the embodiment, the angle θ1 of the inclined surface 201a of the casing 20 can be decided in consideration of the thickness, plane size and the like of the media player 100 placed on the connecting unit 30. Alternatively, the media player 100 may be received and fixed by the receiving section 25 in consideration of the material, thickness and the like of the receiving section 25, instead of considering the angle θ1.

In the projector 1 of the embodiment, to assemble the connecting unit 30, the moving section 40 (slide racks 61) meshes with the slide pinions 62 and then the connection cover 70 is fixed after that. However, connecting unit 30 may also be assembled by first fixing the connection cover 70 and then inserting the moving section 40 into the connection cover 70 from the front, thus causing the slide racks 61 to mesh with the slide pinions 62. The sequence of assembly can be properly changed.

In the projector 1 of the embodiment, the number of units, the mounting positions and the like of the slide racks 61, the slide pinions 62 and the slide spring 63 provided in the slide mechanism section 60 can be properly set.

In the projector 1 of the embodiment, the axis parts 531 are provided as rotation supporting sections which hold the connecting section 50 (connector 511) and rotate in relation to the moving section 40. The axis parts 531 are rotatably held on the holding sections 422 of the moving section 40. However, the axis parts and the holding sections may be reversed. The axis parts may be provided in the moving section 40, and the holding sections for holding the axis parts may be provided in the connecting section 50 as rotation supporting sections.

In the projector 1 of the embodiment, the slide spring 173 which gives the moving section 40 an energizing force in the sending-out direction is made up of a torsion coil spring. However, without being limited to this example, the slide spring may also be made up of a compression coil spring or a tension coil spring.

In the projector 1 of the embodiment, the slide mechanism section 170 has the slide racks 171 (171a, 171b) on both lateral sides of the moving section 40. However, one slide rack may be provided substantially at the center toward the bottom side of the moving section 40.

In the optical unit 18 of the embodiment, the liquid crystal light valve 182 is employed as a light modulator. However, without being limited to this example, generally, any device which modulates an incident luminous flux based on video information may be employed. Other types of light modulators, for example, a micromirror light modulator, can be employed. As a micromirror light modulator, for example, a DMD (digital micromirror device) can be employed.

The entire disclosure of Japanese Patent Applications No. 2010-289487, filed Dec. 27, 2010 and No. 2011-059071, filed Mar. 17, 2011 are expressly incorporated by reference herein.

What is claimed is:

1. A projector comprising:
 a connecting unit for holding an electronic device, wherein the electronic device and the projector contact each other at a position of abutment in a state where the electronic device is held by the connecting unit, and
 a receiving section is installed on an exterior surface of the projector at the position of abutment, wherein
 the connecting unit has an energizing section which energizes a connector to stand at a predetermined angle such that the energization on the connector is constantly in a direction away from the receiving section; and
 when the electronic device is installed on the connecting unit, due to the weight of the electronic device, the electronic device rotates toward the receiving section against the energization and abuts on the receiving section.

2. The projector according to claim 1, wherein the connecting unit includes:
 a connecting section for holding the electronic device, and
 the connecting section holds the electronic device rotatably in a direction to the receiving section.

3. The projector according to claim 2, wherein the connecting section includes:
 the connector which electrically connects the electronic device with the body of the projector; and
 a rotation supporting section which rotatably supports the connector.

4. The projector according to claim 2, wherein
 the connecting section is arranged on a moving section constituted by a separate member from the body of the projector, and
 as the moving section is moved, the connecting section is exposed so that the electronic device can be installed thereon.

5. The projector according to claim 4, wherein the connecting unit has a driving mechanism section for moving the moving section to enter and exit from the body of the projector.

6. The projector according to claim 5, wherein the driving mechanism section includes a slide mechanism section for linearly moving the moving section, the slide mechanism section comprising:
 a slide rack installed on the moving section along a sending-out direction in which the moving section is sent out, and
 a slide pinion which is arranged on the body of the projector and meshes with the slide rack.

7. The projector according to claim 6, wherein the driving mechanism section includes an adjustment mechanism section which adjusts an amount of movement of the moving section.

8. The projector according to claim 1, wherein the energization is achieved with a flexible member.

* * * * *